United States Patent
Scherer et al.

(10) Patent No.: US 8,349,779 B2
(45) Date of Patent: Jan. 8, 2013

(54) POLYMERS WITH H-BRIDGE FORMING FUNCTIONALITIES

(75) Inventors: Markus Scherer, Cologne (DE); Klaus Hedrich, Fischbachtal (DE); Wolfgang Tschepat, Darmstadt (DE)

(73) Assignee: Evonik Rohmax Additives GmbH, Darmstadt (DE)

( * ) Notice: Subject to any disclaimer, the term of this patent is extended or adjusted under 35 U.S.C. 154(b) by 407 days.

(21) Appl. No.: 10/593,082

(22) PCT Filed: Feb. 24, 2005

(86) PCT No.: PCT/EP2005/001904
§ 371 (c)(1),
(2), (4) Date: Sep. 15, 2006

(87) PCT Pub. No.: WO2005/097855
PCT Pub. Date: Oct. 20, 2005

(65) Prior Publication Data
US 2007/0184993 A1   Aug. 9, 2007

(30) Foreign Application Priority Data
Apr. 8, 2004 (DE) .......................... 10 2004 018 093

(51) Int. Cl.
*C10M 145/14* (2006.01)
(52) U.S. Cl. .......................... 508/469; 508/470; 508/471
(58) Field of Classification Search .................. 508/469, 508/470
See application file for complete search history.

(56) References Cited

U.S. PATENT DOCUMENTS

| | | | |
|---|---|---|---|
| 3,554,913 | A | 1/1971 | Gisser et al. |
| 3,562,091 | A | 2/1971 | Oberst et al. |
| 3,970,725 | A | 7/1976 | Tugukuni et al. |
| 4,618,439 | A | 10/1986 | Brandi et al. |
| 4,758,643 | A | 7/1988 | Tanaka et al. |
| 6,096,173 | A | 8/2000 | Von Hippel et al. |
| 6,255,263 | B1 | 7/2001 | Ryan |
| 6,458,750 | B1 * | 10/2002 | Dardin et al. ............ 508/501 |
| 7,235,298 | B2 | 6/2007 | Katusic et al. |
| 7,288,501 | B2 | 10/2007 | Auer et al. |
| 7,374,743 | B2 | 5/2008 | Katusic et al. |
| 7,525,788 | B2 | 4/2009 | Hoerpel et al. |
| 2001/0036437 | A1 | 11/2001 | Gutsch et al. |
| 2001/0055639 | A1 | 12/2001 | Moritz et al. |
| 2002/0086965 | A1 | 7/2002 | Sivik et al. |
| 2003/0060587 | A1 | 3/2003 | Roos et al. |
| 2003/0206854 | A1 | 11/2003 | Gutsch et al. |
| 2004/0077509 | A1 * | 4/2004 | Yuki et al. ............... 508/469 |
| 2004/0132629 | A1 | 7/2004 | Vinci et al. |
| 2005/0148749 | A1 | 7/2005 | Scherer et al. |
| 2005/0221192 | A1 | 10/2005 | Hennige et al. |
| 2005/0239937 | A1 | 10/2005 | Scherer et al. |
| 2005/0245406 | A1 | 11/2005 | Scherer et al. |
| 2005/0261143 | A1 | 11/2005 | Scherer et al. |
| 2005/0267239 | A1 | 12/2005 | Scherer |
| 2006/0189490 | A1 | 8/2006 | Dardin et al. |
| 2006/0240999 | A1 | 10/2006 | Placek et al. |
| 2007/0175362 | A1 | 8/2007 | Gutsch et al. |
| 2007/0254178 | A1 | 11/2007 | Nun |
| 2008/0020190 | A1 | 1/2008 | Nun et al. |
| 2008/0032197 | A1 | 2/2008 | Horpel et al. |
| 2008/0084686 | A1 | 4/2008 | Gutsch et al. |
| 2008/0138700 | A1 | 6/2008 | Horpel et al. |
| 2008/0280050 | A1 | 11/2008 | Nun et al. |
| 2008/0283171 | A1 | 11/2008 | Nun et al. |
| 2008/0305702 | A1 | 12/2008 | Nun et al. |
| 2009/0078485 | A1 | 3/2009 | Gutsch et al. |
| 2010/0000079 | A1 | 1/2010 | Horpel et al. |
| 2010/0003401 | A1 | 1/2010 | Horpel et al. |

FOREIGN PATENT DOCUMENTS

| | | |
|---|---|---|
| DE | 199 09 401 A1 | 9/2000 |
| DE | 103 14 776 A1 | 10/2004 |
| EP | 0 348 565 | 1/1990 |
| EP | 570093 A1 * | 11/1993 |
| EP | 0 711 790 | 5/1996 |
| EP | 1 048 711 A1 | 11/2000 |
| JP | 02-041351 | 2/1990 |
| JP | 2-41351 | 2/1990 |
| JP | 09-003131 | 1/1997 |
| WO | WO 03/080773 A1 | 10/2003 |
| WO | WO 2004/087850 A1 | 10/2004 |

OTHER PUBLICATIONS

Machine translation of JP09003131A, Jan. 1997.*
Canadian Office Action issued Nov. 4, 2010, in Patent Application No. 2,561,172.
Office Action issued Dec. 3, 2010 in Japan Application No. 2007-506673 (English Translation).
U.S. Appl. No. 60/021,600, filed Jul. 11, 1996, Riemenschneider, et al.
U.S. Appl. No. 08/842,775, filed Apr. 17, 1997, Riemenschneider, et al.
U.S. Appl. No. 09/441,439, filed Nov. 17, 1999, Barthold, et al.
U.S. Appl. No. 60/194,367, filed Apr. 4, 2002, Michael, et al.
U.S. Appl. No. 12/746,683, filed Jun. 7, 2010, Hedrich, et al.

(Continued)

*Primary Examiner* — Ellen McAvoy
*Assistant Examiner* — Taiwo Oladapo
(74) *Attorney, Agent, or Firm* — Oblon, Spivak, McClelland, Maier & Neustadt, L.L.P.

(57) ABSTRACT

The invention relates to graft copolymers produced by radically polymerizing polymerisable monomers and, in addition comprising long-chain ethylenically unsaturated compounds which contain alkyl substitutes, in particular acrylates or methacrylates and monomers with hydrogen bridge donator functions. According to said invention, said hydrogen bridge donator monomer is introduced into a polymer backbone and into graft side branches. The inventive polymers are particularly usable for lubricating oil formulations.

24 Claims, No Drawings

OTHER PUBLICATIONS

Canadian Office Action issued Mar. 9, 2011, in Canadian Patent Application No. 2,561,175, filed Feb. 24, 2005 (with English-language Translation).

Japanese Office Action issued Feb. 10, 2011, in Japanese Patent Application No. 2007-506674, filed Feb. 24, 2005 (with English-language Translation).

Canadian Office Action issued Jun. 20, 2011, in Canadian Patent Application No. 2,561,172, filed Feb. 24, 2005 (with English-language Translation).

Korean Office Action dated Jul. 14, 2011 issued in the corresponding Korean Patent Application No. 10-2006-7020862, filed Oct. 4, 2006 (with English-language Translation).

Canadian Office Action issued Nov. 23, 2011, in Patent Application No. 2,561,175.

Office Action issued Feb. 24, 2012 in Canadian Patent Application No. 2,561,172.

Canadian Office Action issued Jun. 28, 2012 in Patent application No. 2,561,175.

* cited by examiner

POLYMERS WITH H-BRIDGE FORMING FUNCTIONALITIES

RELATED APPLICATION

This application is a national stage entry of PCT/EP05/01904 filed on Feb. 24, 2005 which claims priority from German Patent Application No. 10 2004 018 093.8, filed on Apr. 8, 2004, which is incorporated by reference in its entirety.

FIELD OF THE INVENTION

The present application relates to graft copolymers which are formed from free-radically polymerizable monomers and which, in addition to ethylenically unsaturated compounds substituted by long alkyl chains, especially acrylates or methacrylates, additionally also comprise monomers with hydrogen bond donor functions. According to the invention, the monomer with the hydrogen bond donor property is present both in the polymer backbone and in the grafted side branches. In addition to polymers which contain monomers with hydrogen bond donor function, also disclosed are those which contain monomers which simultaneously bear hydrogen bond donor and hydrogen bond acceptor functions. The polymers are particularly suitable as additives for lubricant oil formulations. It has been found that the hydrogen bond donor functions in the polymer, but in particular the simultaneous presence of hydrogen bond donor and acceptor functions, have positive effects on wear protection, detergency and dispersancy.

STATE OF THE ART

Polyalkyl acrylates are common polymeric additives for lubricant oil formulations. Long alkyl chains (typical chain length: C8-C18) in the ester functionalities of the acrylate monomers impart a good solubility in apolar solvents, for example mineral oil, to polyalkyl acrylates. Common fields of use of the additives are hydraulic, gearbox or motor oils. A viscosity index (VI)-optimizing action is attributed to the polymers, from where the name VI improvers originates. A high viscosity index means that an oil possesses a relatively high viscosity at high temperatures (for example in a typical range of 70-140° C.) and a relatively low viscosity at low temperatures (for example in a typical range of −60-20° C.). The improved lubricity of an oil at high temperatures compared to a non-polyacrylate-containing oil which has an otherwise identical kinematic viscosity at, for example, 40° C. is caused by a higher viscosity in the increased temperature range. At the same time, in the case of utilization of a VI improver at relatively low temperature, as is present, for example, during the cold-start phase of an engine, a lower viscosity is recorded in comparison to an oil which otherwise has an identical kinematic viscosity at 100° C. As a result of the lower viscosity of the oil during the start-up phase of an engine, a cold start is thus eased substantially.

In recent times, polyacrylate systems which, as well as VI optimization, provide additional properties, for example dispersancy, have become established in the lubricants industry. Either alone or together with dispersant-inhibitor (DI) additives used specifically for dispersion purposes, such polymers have the effect, inter alia, that the oxidation products occurring as a result of stress on the oil contribute less to a disadvantageous viscosity rise. By means of improved dispersibility, the lifetime of a lubricant oil can be extended. By virtue of their detergent action, such additives likewise have the effect that the engine cleanliness, for example expressed by the piston cleanliness or ring sticking, is influenced positively. Oxidation products are, for example, soot or sludge. In order to impart dispersancy to polyacrylates, nitrogen-containing functionalities may be incorporated into the side chains of the polymers. Common systems are polymers which bear partly amine-functionalized ester side chains. Often, dialkylamine-substituted meth-acrylates, their methacrylamide analogs or N-hetero-cyclic vinyl compounds are used as comonomers for improving the dispersion capacity. A further class of monomer types which should be mentioned owing to their dispersancy in lubricants is that of acrylates with ethoxylate- or propoxylate-containing functions in the ester substituents. The dispersible monomers may be present either randomly in the polymer, i.e. are incorporated into the polymer in a classical copolymerization, or else grafted onto a polyacrylate, which results in systems with a non-random structure.

There has to date been no targeted research for polyacrylates which, as well as the known advantages in relation to dispersancy detergency, also offer advantages in relation to wear reduction.

EP 164 807 (Agip Petroli S.p.A) describes a multi-functional VI improver with dispersancy, detergency and low-temperature action. The composition of the VI improvers corresponds to NVP-grafted polyacrylates which additionally contain difficult-to-prepare acrylates with amine-containing ethoxylate radicals.

DE-A 1 594 612 (Shell Int. Research Maatschappij N.V.) discloses lubricant oil mixtures which comprise oil-soluble polymers with carboxyl groups, hydroxyl groups and/or nitrogen-containing groups and a dispersed salt or hydroxide of an alkaline earth metal. As a result of the synergistic mode of action of these components, wear-reducing action is observed.

U.S. Pat. No. 3,153,640 (Shell Oil Comp.) includes copolymers consisting of long-chain esters of (meth)acrylic acid and N-vinyllactams, which exhibit an advantageous influence on wear in lubricant applications. The polymers described are random copolymers. Monomers having hydrogen bond donor function and graft copolymers are not mentioned.

In ASLE Transactions (1961, 4, 97-108), E. H. Okrent states that polyisobutylenes or polyacrylates used as VI improvers have influence on the wear behavior in the engine. No inferences are made on the chemistry used and the specific composition of the polymers. Wear-reducing action is accounted for merely with visco-elastic effects of polymer-containing oils. For example, no differences are detected between poly-acrylate and PIB-containing oils in influence on wear.

Literature publications by Neudörfl and Schödel (Schmierungstechnik 1976, 7, 240-243; SAE Paper 760269; SAE Paper 700054; Die Angewàndte Makromolekulare Chemie 1970, 2, 175-188) emphasize in particular the influence of the polymer concentration on the engine wear. Reference is made to the aforementioned article by E. H. Okrent and, in analogy to Okrent, no connection of a wear-improving action with the chemistry of the polymer is made. Generally, it is concluded that viscosity index improvers of low molecular weight bring improved wear results.

Like Neudörfl and Schödel, K. Yoshida (Tribology Transactions 1990, 33, 229-237) attributes effects of polymers on the wear behavior merely to viscometric aspects. Advantageous effects are explained with the preferred tendency to elastohydrodynamic film formation.

Almost without exception, the polymers known in the prior art are formed from monomers whose dispersing functionalities bear groups which are hydrogen bond acceptors (referred to hereinafter as H-bond acceptors), or, like dimethylaminopropylmethacrylamide, have both a functionality with hydrogen bond acceptor and a functionality with hydrogen bond donor (referred to hereinafter as H-bond donor). It is a further feature of such polymers useful for motor oil applications that the monomers bearing N-heterocycle have preferably been grafted onto the polymer backbone. Polymers containing dimethylaminopropylmethacrylamide are, in contrast, random copolymers and not graft copolymers.

It was therefore an object of the present invention to provide novel graft copolymers containing monomers with H-bond donor functions, to provide multifunctional VI improvers which, in lubricant oil formulations, are notable not only for their VI action but also for their dispersancy and/or detergency, to provide multifunctional VI improvers which, in lubricant oil formulations, are notable not only for their VI action, but also for their positive influence on wear behavior, to provide a universally applicable process for preparing graft copolymers containing grafted monomers with H-bond donor functions. In particular it should be possible to prepare homogeneous polymer solutions of clear appearance by grafting monomers with H-bond donor functions.

to provide lubricants comprising the inventive graft copolymers with improved properties in relation to wear protection, dispersancy and detergency, corrosion behavior and oxidation stability.

These objects, and also further objects which are not stated explicitly but which can be derived or discerned directly from the connections discussed by way of introduction herein are achieved by a graft copolymer containing, in the backbone, free-radically polymerized units of a) from 0.01 to 15% by weight of a compound of the formula (I)

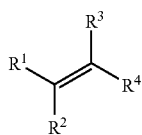

in which $R^1$, $R^2$ and $R^3$ may each independently be hydrogen or an alkyl group having from 1 to 5 carbon atoms and $R^4$ is a group which has one or more structural units capable of forming hydrogen bonds and is a hydrogen donor, and b) from 0 to 40% by weight of one or more (meth)acrylates of the formula (II)

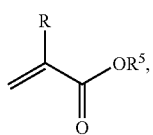

in which R is hydrogen or methyl and $R^5$ is a linear or branched alkyl radical having from 1 to 5 carbon atoms, c) from 35 to 99.99% by weight of one or more ethylenically unsaturated ester compounds of the formula (III)

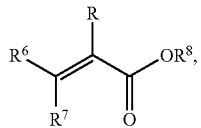

in which R is hydrogen or methyl, $R^8$ is a linear, cyclic or branched alkyl radical having from 6 to 40 carbon atoms, $R^6$ and $R^7$ are each independently hydrogen or a group of the formula —$COOR^8$ where $R^8$ is hydrogen or a linear, cyclic or branched alkyl radical having from 6 to 40 carbon atoms, have, and d) from 0 to 40% by weight of one or more comonomers, where the percentage by weight of the above components is based on the total weight of the ethylenically unsaturated monomers of the backbone and where a') from 0.01 to 25% by weight, based on the total weight of the copolymer, of a compound of the formula (I)

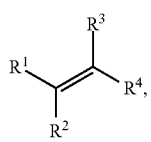

in which $R^1$, $R^2$ and $R^3$ may each independently be hydrogen or an alkyl group having from 1 to 5 carbon atoms and $R^4$ is a group which has one or more structural units capable of forming hydrogen bonds and is a hydrogen donor, and b') from 0 to 20% by weight, based on the total weight of the copolymer, of one or more compounds of the formula (IV)

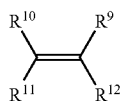

in which $R^9$, $R^{10}$ and $R^{11}$ may each independently be hydrogen or an alkyl group having from 1 to 5 carbon atoms and $R^{12}$ is either a $C(O)OR^{13}$ group and $R^{13}$ is a linear or branched alkyl radical which is substituted by at least one —$NR^{14}R^{15}$ group and has from 2 to 20, preferably from 2 to 6 carbon atoms, where $R^{14}$ and $R^{15}$ are each independently hydrogen, an alkyl radical having from 1 to 20, preferably from 1 to 6, and where $R^{14}$ and $R^{15}$, including the nitrogen atom and, if present, a further nitrogen or oxygen atom, form a 5- or 6-membered ring which may optionally be substituted by $C_1$-$C_6$-alkyl, or $R^{12}$ is an $NR^{16}C(=o)R^{17}$ group where $R^{16}$ and $R^{17}$ together form an alkylene group having from 2 to 6, preferably from 2 to 4 carbon atoms, where they form a 4- to 8-membered, preferably from 4- to 6-membered, saturated or unsaturated ring, if appropriate including a further nitrogen or oxygen atom, where this ring may also optionally be substituted by $C_1$-$C_6$-alkyl, are grafted onto the backbone of the copolymer.

Appropriate modifications of the inventive graft copolymers are protected in the subclaims dependent upon claim 1.

With regard to the process for preparing graft copolymers, claims 10 to 14 provide solutions to the underlying problems, while claims 15 to 17 protect a lubricant oil formulation using the graft copolymers prepared according to the present invention and also the preferred uses thereof.

ADVANTAGES OF THE INVENTION

The inventive polymers with hydrogen bond donor functions in the polymer, especially the polymers with simultaneous presence of hydrogen bond donor and acceptor functions, have positive effects on wear protection, detergency and dispersancy of the lubricant oil formulations produced with them. The polymers therefore constitute a wear-reducing alternative or supplement to the phosphorus and sulfur additives customary in industry, and help to avoid their known disadvantages.

In particular, the advantages achieved in wear behavior have a positive effect on the energy consumption, for example of a diesel or gasoline engine.

The formulations produced using the inventive graft copolymers feature good corrosion behavior and also good oxidation resistance.

The kinematic viscosity of polymer solutions which comprise methacrylic acid grafted in accordance with the invention has been lowered substantially compared to the comparable polymer which contains exclusively methacrylic acid in the polymer backbone.

The process disclosed for preparing graft copolymers leads to homogeneous polymer solutions of clear appearance and demonstrates that the synthesis principle presented herein is of universal character, i.e. can be applied not just to the grafting of carboxylic acids but also, for example, with carboxamides.

At the same time, the process according to the invention allows a series of further advantages to be achieved. These include:

With regard to pressure, temperature and solvent, the performance of the polymerization is relatively unproblematic; even at moderate temperatures, acceptable results are achieved under certain conditions.

The process according to the invention is low in side reactions.

The process can be performed inexpensively.

With the aid of the process according to the invention, high yields can be achieved.

With the aid of the process of the present invention, it is possible to prepare polymers with a predefined constitution and controlled structure.

The polymers which have VI and dispersing action and have been used to date in motor oils, as discussed above, comprise preferably monomer types with H-bond acceptor functionalities, which are especially N-heterocycles. It was therefore not directly foreseeable that the use of monomers with H-bond donor properties leads to polymers which possess the improved properties described.

Since it is known from the prior art that the grafting of monomers with H-bond donor functions onto polyalkyl acrylates is generally difficult, it was not immediately foreseeable that the grafting of this monomer type to polyacrylates can be achieved without any problems and with a wide range of application when, before the grafting, a small portion of one of these monomers has been incorporated into the backbone of the polyacrylate by polymerization. It was especially surprising that grafting performed more than once in succession was even possible, without there being the formation of unutilizable products. This is especially against the background that corresponding synthesis attempts according to the prior art afford inhomogeneous products having a cloudy appearance.

DETAILED DESCRIPTION OF THE INVENTION

The graft copolymers contain, as components, one or more compounds of the formula (I)

in which $R^1$, $R^2$ and $R^3$ may each independently be hydrogen or an alkyl group having from 1 to 5 carbon atoms and $R^4$ is a group which has one or more structural units capable of forming hydrogen bonds and is a hydrogen donor.

The definition of a functionality as a group with hydrogen bond acceptor or hydrogen bond donor action can be taken from the current literature or known chemical reference works, for example "Römpp Lexikon Chemie, 10th edition, 1999, Verlag Thieme Stuttgart New York".

According to this, a hydrogen bond (H-bond) is an important form of secondary valence bond which forms between a hydrogen atom bonded covalently to an atom of an electronegative element (hydrogen bond donor, proton donor, X) and the solitary electron pair of another electronegative atom (proton acceptor, Y). In general, such a system is formulated as RX—H . . . YR', where the dotted line symbolizes the hydrogen bond. Possible X and Y are mainly O, N, S and halogens. In some cases (e.g. HCN), C can also function as a proton donor. The polarity of the covalent bond of the donor causes a positive partial charge, $\delta^+$, of the hydrogen (proton), while the acceptor atom bears a corresponding negative partial charge, $\delta^-$.

Characteristic, structural and spectroscopic properties of a complex bonded via a hydrogen bond are:

a) The distance $r_{HY}$ is distinctly less than the sum of the van der Waals radii of the atoms H and Y.

b) The XH equilibrium nucleus separation is enlarged compared to the free molecule RX—H.

c) The XH stretching vibration (donor stretching vibration) experiences a shift to longer wavelengths ("red shift"). In addition, its intensity increases distinctly (in the case of relatively strong H-bonds, by more than one order of magnitude).

d) Owing to mutual polarization, the dipole moment of the H-bond-bonded complex is greater than what corresponds to the vector sum of the dipole moments of the constituents.

e) The electron density at the bond hydrogen atom is reduced in the case of formation of a hydrogen bond. This effect is expressed experimentally in the form of reduced NMR shifts (reduced shielding of the proton). At relatively short intermolecular distances, the electron shells of the monomers overlap. In this case, a chemical bond associated with a certain charge transfer of the 4-electron, 3-center bond type can form. In addition, exchange repulsion is present, since the Pauli principle keeps electrons with identical spins apart and prevents two monomers from coming too close. The dissociation energies $D_0 = \Delta H_0$ (molar enthalpies of the reaction RX—H . . . YR'→RX—H+YR' at the absolute zero point) are generally between 1 and 50 kJ mol$^{-1}$. For their experimental determination, thermochemical measurements (2 virial coefficients, thermal conductivities) or spectroscopic analyses are employed (more on this subject can be taken from "Chem. Rev. 88, Chem. Phys. 92, 6017-6029 (1990)).

For hydrogen atoms of structural units which are capable of forming H-bonds and are an H-donor, it is characteristic that they are bonded to relatively electronegative atoms, for example oxygen, nitrogen, phosphorus or sulfur. The terms "electronegative" or "electropositive" are familiar to those skilled in the art as a designation for the tendency of an atom in a covalent bond to pull the valence electron pair or pairs toward it in the sense of an asymmetric distribution of the electrons, which forms a dipole moment. A more detailed discussion of the terms "electronegativity" and "hydrogen bonds" can be found, for example, in "Advanced Organic Chemistry", J. March, 4th edition, J. Wiley & Sons, 1992.

In some dimers, more than one hydrogen bond is formed, for example in dimers of carboxylic acids which form cyclic structures. Cyclic structures are frequently also favored energetically in higher oligomers, for example in oligomers of methanol above the trimers. The dissociation energy of the trimer into 3 monomers at 52 kJ·mol$^{-1}$ is nearly four times as large as that of the dimer. Non-additivity in the dissociation energies per monomer is a typical property of complexes bonded via hydrogen bonds.

In the case of H-bond-forming functionalities, the present invention relates in particular to heteroatom-containing groups, where the heteroatom is preferably O, N, P or S. Even though a carbon-hydrogen bond can theoretically also function as an H-bond donor, such functions shall not fall within the scope of the claims made herein for functionalities with H-bond donor function.

Monomers with H-bond donor functions are, for example, the ethylenically unsaturated carboxylic acids and all of their derivatives which still have at least one free carboxyl group. Examples thereof are:

acrylic acid, methacrylic acid, 1-[2-(isopropenylcarbonyloxy)ethyl]maleate (monoester of 2-hydroxyethyl methacrylate (HEMA) and maleic acid), 1-[2-(vinylcarbonyloxy)ethyl]maleate (monoester of 2-hydroxyethyl acrylate (HEA) and maleic acid), 1-[2-(isopropenylcarbonyloxy)ethyl]succinate (monoester of HEMA and succinic acid), 1-[2-(vinylcarbonyloxy)ethyl]succinate (monoester of HEA and succinic acid), 1-[2-(isopropenylcarbonyloxy)ethyl]phthalate (monoester of HEMA and phthalic acid), 1-[2-(vinylcarbonyloxy)ethyl]phthalate (monoester of HEA and phthalic acid), 1-[2-(isopropenylcarbonyloxy)ethyl]hexahydrophthalate (monoester of HEMA and hexahydrophthalic acid), 1-[2-(vinylcarbonyloxy)ethyl]-hexahydrophthalate (monoester of HEA and hexahydrophthalic acid), 1-[2-(isopropenylcarbonyloxy)butyl]-maleate (monoester of 2-hydroxybutyl methacrylate (HBMA) and maleic acid), 1-[2-(vinylcarbonyloxy)butyl]-maleate (monoester of 2-hydroxybutyl acrylate (HBA) and maleic acid), 1-[2-(isopropenylcarbonyloxy)butyl]-succinate (monoester of HBMA and succinic acid), 1-[2-(vinylcarbonyloxy)butyl]succinate (monoester of HBA and succinic acid), 1-[2-(isopropenylcarbonyloxy)butyl]-phthalate (monoester of HBMA and phthalic acid), 1-[2-(vinylcarbonyloxy)butyl]phthalate (monoester of HBA and phthalic acid), 1-[2-(isopropenylcarbonyloxy)butyl]-hexahydrophthalate (monoester of HBMA and hexahydro-phthalic acid), 1-[2-(vinylcarbonyloxy)butyl]hexahydro-phthalate (monoester of HBA and hexahydrophthalic acid), fumaric acid, methylfumaric acid, monoesters of fumaric acid or their derivatives, maleic acid, methylmaleic acid, monoesters of maleic acid or their derivatives, crotonic acid, itaconic acid, acrylamidoglycolic acid, methacrylamidobenzoic acid, cinnamic acid, vinylacetic acid, trichloroacrylic acid, 10-hydroxy-2-decenoic acid, 4-methacryloyloxyethyl-trimethyl acid, styrenecarboxylic acid.

Particular preference is given to acrylic acid and methacrylic acid.

Further suitable monomers with H-bond donor function are acetoacetate-functionalized (e.g. LONZAMON® AAEMA from Lonza) ethylenically unsaturated compounds, for example 2-acetoacetoxymethyl methacrylate or 2-acetoacetoxyethyl acrylate. These compounds may be present at least partly in the tautomeric enol form.

Also suitable as monomers with H-bond donor function are all ethylenically unsaturated monomers having at least one sulfonic acid group and/or at least one phosphonic acid group. These are all organic compounds which have both at least one ethylenic double bond and at least one sulfonic acid group and/or at least one phosphonic acid group. They include, for example:

2-(isopropenylcarbonyloxy)ethanesulfonic acid, 2-(vinylcarbonyloxy)ethanesulfonic acid, 2-(iso-propenylcarbonyloxy)propylsulfonic acid, 2-(vinyl-carbonyloxy)propylsulfonic acid, 2-acrylamido-2-methyl-propanesulfonic acid, acrylamidododecanesulfonic acid, 2-propene-1-sulfonic acid, methallylsulfonic acid, styrenesulfonic acid, styrenedisulfonic acid, meth-acrylamidoethanephosphonic acid, vinylphosphonic acid, 2-phosphatoethyl methacrylate, 2-sulfoethyl methacrylate, Ω-alkenecarboxylic acids such as 2-hydroxy-4-pentenoic acid, 2-methyl-4-pentenoic acid, 2-n-propyl-4-pentenoic acid, 2-isopropyl-4-pentenoic acid, 2-ethyl-4-pentenoic acid, 2,2-dimethyl-4-pentenoic acid, 4-pentenoic acid, 5-hexenoic acid, 6-heptenoic acid, 7-octenoic acid, 8-nonenoic acid, 9-decenoic acid, 10-undecenoic acid, 11-dodecenoic acid, 12-tridecenoic acid, 13-tetradecenoic acid, 14-pentadecenoic acid, 15-hexadecenoic acid, 16-heptadecenoic acid, 17-octadecenoic acid, 22-tricosenoic acid, 3-butene-1,1-dicarboxylic acid.

Equally suitable as monomers are acid amides, which are known, just like the carboxylic acids, to be able to act simultaneously both as H-bond donors and as H-bond acceptors. The unsaturated carboxamides may either bear an unsubstituted amide moiety or an optionally mono-substituted carboxamide group. Suitable compounds are, for example:

amides of (meth)acrylic acid and N-alkyl-substituted (meth)acrylamides, such as N-(3-dimethylaminopropyl)methacrylamide, N-(diethylphosphono)methacrylamide, 1-methacryloyl-amido-2-methyl-2-propanol, N-(3-dibutylaminopropyl)-methacrylamide, N-t-butyl-N-(diethylphosphono)methacrylamide, N,N-bis(2-diethylaminoethyl)methacrylamide, 4-methacryloylamido-4-methyl-2-pentanol, N-(butoxy-methyl)methacrylamide, N-(methoxymethyl)methacrylamide, N-(2-hydroxyethyl)methacrylamide, N-acetylmethacrylamide, N-(dimethylaminoethyl)methacrylamide, N-methyl-methacrylamide, N-methacrylamide, methacrylamide, acrylamide, N-isopropylmethacrylamide; aminoalkyl methacrylates, such as tris(2-methacryloxyethyl)amine, N-methylformamidoethyl methacrylate, N-phenyl-N'-methacryloylurea, N-methacryloylurea, 2-ureidoethyl methacrylate; N-(2-methacryloyloxyethyl)ethyleneurea, heterocyclic (meth)acrylates such as 2-(1-imidazolyl)-ethyl (meth)acrylate, 2-(4-morpholinyl)ethyl (meth)-acrylate, 1-(2-methacryloyloxyethyl)-2-pyrrolidone, furfuryl methacrylate.

Carboxylic esters likewise suitable as H-bond donors are: 2-tert-butylaminoethyl methacrylate, N-methylformamidoethyl methacrylate, 2-ureidoethyl methacrylate; heterocyclic (meth)acrylates such as 2-(1-imidazolyl)-ethyl (meth) acrylate, 1-(2-methacryloyloxyethyl)-2-pyrrolidone.

Hydroxyalkyl (meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol methacrylate, 1,10-decanediol (meth)acrylate, 1,2-propanediol (meth)acrylate; polyoxyethylene and polyoxypropylene derivatives of (meth)acrylic acid, such as triethylene glycol mono(meth)acrylate, tetraethylene glycol mono(meth)acrylate and tetrapropylene glycol mono (meth)acrylate. Methacryloylhydroxamic acid, acryloylhydroxamic acid, N-alkylmethacryloylhydroxamic acid, N-alkylacryloylhydroxamic acid, reaction product of methacrylic or acrylic acid with lactams, for example with caprolactam, reaction product of methacrylic or acrylic acid with lactones, for example with caprolactone; reaction product of methacrylic or acrylic acid with acid anhydrides; reaction product of methacrylamide or acrylamide with lactams, for example with caprolactam, reaction product of methacrylamide or acrylamide with lactones, for example with caprolactone; reaction product of methacrylamide or acrylamide with acid anhydrides.

The content of compounds which have one or more structural units capable of forming H-bonds and are H-donors is from 0.01 to 15% by weight, preferably from 0.1 to 10% by weight and more preferably from 0.5 to 8% by weight, based on the total weight of the ethylenically unsaturated monomers of the backbone of the graft copolymer.

The inventive graft copolymers containing, as a further component of the backbone, compounds of the formula II

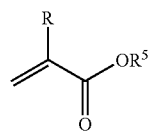

(II)

where R is hydrogen or methyl and $R^5$ is a linear or branched alkyl radical having from 1 to 5 carbon atoms.

Examples of components of the formula II include (meth)acrylates which derive from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate;

cycloalkyl (meth)acrylates such as cyclopentyl (meth)acrylate;

(meth)acrylates which derive from unsaturated alcohols, such as 2-propynyl (meth)acrylate and allyl (meth)acrylate, vinyl (meth)acrylate.

The content of (meth)acrylates of the formula (II) is from 0 to 40% by weight, from 0.1 to 30% by weight or from 1 to 20% by weight, based on the total weight of the ethylenically unsaturated monomers of the backbone of the graft copolymer.

The inventive graft copolymers comprise, as a further component of the backbone, one or more of the ethylenically unsaturated ester compounds of the formula III

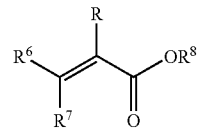

(III)

where R is hydrogen or methyl, $R^8$ is a linear, cyclic or branched alkyl radical having from 6 to 40 carbon atoms, $R^6$ and $R^7$ are each independently hydrogen or a group of the formula —$COOR^8$ where $R^8$ is hydrogen or a linear, cyclic or branched alkyl radical having from 6 to 40 carbon atoms.

These compounds of the formula (III) include (meth)acrylates, maleates and fumarates, each of which have at least one alcohol radical having from 6 to 40 carbon atoms.

Preference is given here to (meth)acrylates of the formula (IIIa)

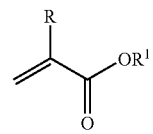

(IIIa)

where
R is hydrogen or methyl and $R^1$ is a linear or branched alkyl radical having from 6 to 40 carbon atoms.

When the expression "(meth)acrylates" is used in the context of the present application, this term in each case encompasses methacrylates or acrylates alone or else mixtures of the two. These monomers are widely known. They include (meth)acrylates which derive from saturated alcohols, such as hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate; (meth)acrylates which derive from unsaturated alcohols, for example oleyl (meth)acrylate;

cycloalkyl (meth)acrylates such as 3-vinylcyclohexyl (meth)acrylate, cyclohexyl (meth)acrylate, bornyl (meth)acrylate.

The ester compounds with a long-chain alcohol radical can be obtained, for example, by reacting (meth)acrylates, fumarates, maleates and/or the corresponding acids with long-chain fatty alcohols, which generally forms a mixture of esters, for example (meth)acrylates with various long-chain alcohol radicals. These fatty alcohols include Oxo Alcohol® 7911 and Oxo Alcohol® 7900, Oxo Alcohol® 1100 from Monsanto; Alphanol® 79 from ICI; Nafol® 1620, Alfol® 610 and Alfol® 810 from Sasol; Epal® 610 and Epal® 810 from Ethyl Corporation; Linevol® 79, Linevol® 911 and Dobanol® 25L from Shell; Lial 125® from Sasol; Dehydad® and Lorol® types from Henkel KGaA, and Linopol® 7-11 and Acropol® 91.

The long-chain alkyl radical of the (meth)acrylates of the formula III has generally from 6 to 40 carbon atoms, preferably from 6 to 24 carbon atoms, more preferably from 8 to 18 carbon atoms, and may be linear, branched, mixed linear/branched or have cyclic fractions. The preferred embodiment is to use a mixture of methyl methacrylate and C8-C18-alkyl methacrylates as the methacrylates.

The alcohols with long-chain alkyl radicals which are used to prepare the (meth)acrylic esters are commercially available and consist generally of more or less broad mixtures of different chain lengths. In these cases, the specification of the number of carbon atoms is generally based on the mean carbon number. When an alcohol or a long-chain (meth)acrylic ester prepared using this alcohol is referred to as "C-12" alcohol or as "C-12" ester in the context of the present application, the alkyl radical of these compounds will generally comprise, in addition to alkyl radicals having 12 carbon atoms, also possibly those having 8, 10, 14 or 16 carbon atoms in smaller fractions, the mean carbon number being 12. When, in the context of the present application, for example, a compound is designated as C12-C18-alkyl acrylate, this means a mixture of esters of acrylic acid which is characterized in that linear and/or branched alkyl substituents are present and that the alkyl substituents contain between 12 and 18 carbon atoms.

The content of the (meth)acrylates of the formula (III) or (IIIa) is from 35 to 99.99% by weight, from 40 to 99% by weight or from 50 to 80% by weight, based on the total weight of the ethylenically unsaturated monomers of the backbone of the graft copolymer.

To form the backbone of the graft copolymer, it is also possible for from 0 to 40% by weight, in particular from 0.5 to 20% by weight, based on the total weight of the ethylenically unsaturated monomers of the backbone of the graft copolymer, of one or more free-radically polymerizable further monomers to be involved. Examples thereof are nitriles of (meth)acrylic acid and other nitrogen-containing methacrylates, such as methacryloylamidoacetonitrile, 2-methacryloyloxyethyl-methylcyanamide, cyanomethyl methacrylate; aryl (meth)acrylates, such as benzyl methacrylate or phenyl methacrylate, where the aryl radicals may each be unsubstituted or up to tetrasubstituted; carbonyl-containing methacrylates such as oxazolidinylethyl methacrylate, N-(methacryloyloxy)formamide, acetonyl methacrylate, N-methacryloylmorpholine, N-methacryloyl-2-pyrrolidinone; glycol dimethacrylates such as 1,4-butanediol methacrylate, 2-butoxyethyl methacrylate, 2-ethoxyethoxymethyl methacrylate, 2-ethoxyethyl methacrylate, methacrylates of ether alcohols, such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate; methacrylates of halogenated alcohols, such as 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate; oxiranyl methacrylates such as 2,3-epoxybutyl methacrylate, 3,4-epoxybutyl methacrylate, glycidyl methacrylate; phosphorus-, boron- and/or silicon-containing methacrylates such as 2-(dimethylphosphato)propyl methacrylate, 2-(ethylenephosphito)propyl methacrylate, dimethylphosphinomethyl methacrylate, dimethylphosphonoethyl methacrylate, diethylmethacryloyl phosphonate, dipropylmethacryloyl phosphate; sulfur-containing methacrylates, such as ethylsulfinylethyl methacrylate, 4-thiocyanatobutyl methacrylate, ethylsulfonylethyl methacrylate, thio-cyanatomethyl methacrylate, methylsulfinylmethyl methacrylate, bis(methacryloyloxyethyl) sulfide; trimethacrylates such as trimethylolpropane trimethacrylate;

vinyl halides, for example vinyl chloride, vinyl fluoride, vinylidene chloride and vinylidene fluoride; α, vinyl esters such as vinyl acetate; styrene, substituted styrenes having an alkyl substituent in the side chain, for example α-methylstyrene and α-ethylstyrene, substituted styrenes with an alkyl substituent on the ring, such as vinyltoluene and p-methylstyrene, halogenated styrenes, for example monochlorostyrenes, dichlorostyrenes, tribromostyrenes and tetrabromostyrenes; heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid derivatives, for example diesters of maleic acid, where the alcohol radicals have from 1 to 9 carbon atoms, maleic anhydride, methylmaleic anhydride, maleimide, methylmaleimide;

fumaric acid derivatives, for example diesters of fumaric acid, where the alcohol radicals have from 1 to 9 carbon atoms;

dienes, for example divinylbenzene.

Free-radically polymerizable α-olefins having 4-40 carbon atoms.

Representative examples include:

butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, heneicosene-1, docosene-1, trocosene-1, tetracosene-1, pentacosene-1, hexacosene-1, heptacosene-1, octacosene-1, nonacosene-1, triacontene-1, hentria-contene-1, dotriacontene-1, or the like. Also suitable are branched-chain alkenes, for example vinylcyclohexane, 3,3-dimethylbutene-1,3-methylbutene-1, diisobutylene-4-methylpentene-1 or the like.

Also suitable are alkenes-1 having from 10 to 32 carbon atoms which are obtained in the polymerization of ethylene, propylene or mixtures, these materials in turn being obtained from hydrocracked materials.

From 0.01 to 25% by weight, based on the total weight of the copolymer, are grafted onto the backbone of the copolymer

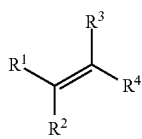

(I)

where $R^1$, $R^2$ and $R^3$ may each independently be hydrogen or an alkyl group having from 1 to 5 carbon atoms, and $R^4$ is a group which has one or more structural units capable of forming H-bonds and is an H-donor. In particular embodiments, the fraction of grafted compounds of the formula (I) may also be from 0.1 to 20% by weight, from 1 to 15% by weight or from 1 to 10% by weight, based in each case on the total weight of the copolymer. The maximum possible amount of monomer which can be used for the grafting depends upon the chemical nature of the monomer in a manner understandable to the person skilled in the art. For example, it will be more easily possible to incorporate an amount corresponding to the upper limiting range of the amount added into the graft copolymer when a dialkylaminoalkyl(meth)acrylamide is used, while the amount added of more strongly polar monomers such as methacrylic acid or acrylic acid will appropriately vary within the region of less than 10% by weight or less than 5% by weight.

The structure of the compounds of the formula (I) and specific examples thereof have already been described in detail for the components of the backbone and reference is made here explicitly thereto.

The grafting to the backbone may optionally additionally be carried out with from 0 to 20% by weight or with from 0 to 10% by weight, based on the total weight of the copolymer, of one or more compounds of the formula (IV)

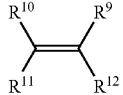

(IV)

in which $R^9$, $R^{10}$, $R^{11}$ and $R^{12}$ are each as already defined.

Examples of compounds of the formula (IV) include N,N-dimethylacrylamide and N,N-dimethylmethacrylamide, N,N-diethylacrylamide and N,N-diethylmethacylamide, aminoalkyl methacrylates such as tris(2-methacryloyloxyethyl)amine, N-methylformamidoethyl methacrylate, 2-ureidoethyl methacrylate;
heterocyclic (meth)acrylates such as 2-(1-imidazolyl)-ethyl (meth)acrylate, 2-(4-morpholinyl)ethyl (meth)acrylate and 1-(2-methacryloylethyl)-2-pyrrolidone,
heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, vinylpiperidine, 9-vinylcarbazole, 3-vinyl-carbazole, 4-vinylcarbazole, 1-vinylimidazole, 2-methyl-1-vinylimidazole, N-vinylpyrrolidone, 2-vinyl-pyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinyl-thiazoles and hydrogenated vinylthiazoles, vinyl-oxazoles and hydrogenated vinyloxazoles.

Preparation of the Polymers

The aforementioned ethylenically unsaturated monomers may be used individually or as mixtures. It is additionally possible to vary the monomer composition during the polymerization.

Basic polymerization techniques for the preparation of the polymers are known per se. For instance, these polymers can be effected especially by free-radical polymerization, and also related processes, for example ATRP (=atom transfer radical polymerization) or RAFT (=reversible addition fragmentation chain transfer).

The customary free-radical polymerization is explained, inter alia, in Ullmanns's Encyclopedia of Industrial Chemistry, Sixth Edition. In general, a polymerization initiator is used for this purpose.

These include the azo initiators well known in the technical field, such as AIBN and 1,1-azo-biscyclohexanecarbonitrile, and also peroxy compounds such as methyl ethyl ketone peroxide, acetylacetone peroxide, dilauryl peroxide, tert-butyl per-2-ethyl-hexanoate, ketone peroxide, tert-butyl peroctoate, methyl isobutyl ketone peroxide, cyclohexanone peroxide, dibenzoyl peroxide, tert-butyl peroxy-benzoate, tert-butyl peroxyisopropylcarbonate, 2,5-bis-(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the aforementioned compounds with one another, and also mixtures of the aforementioned compounds with compounds which have not been mentioned and can likewise form free radicals.

The ATRP process is known per se. It is assumed that it is a "living" free-radical polymerization, without any intention that this should restrict the description of the mechanism. In these processes, a transition metal compound is reacted with a compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly. This reaction is described, for example, by J-S. Wang, et al., J. Am. Chem. Soc., vol. 117, p. 5614-5615 (1995), by Matyjaszewski, Macromolecules, vol. 28, p. 7901-7910 (1995). In addition, the patent applications WO 96/30421, WO 97/47661, WO 97/18247, WO 98/40415 and WO 99/10387, disclose variants of the ATRP explained above.

In addition, the inventive polymers may be obtained, for example, also via RAFT methods. This process is presented in detail, for example, in WO 98/01478, to which reference is made explicitly for the purposes of disclosure.

The polymerization may be carried out at standard pressure, reduced pressure or elevated pressure. The polymerization temperature too is uncritical. However, it is generally in the range of −20°-200° C., preferably 0°-130° C. and more preferably 60°-120° C.

The polymerization may be carried out with or without solvent. The term solvent is to be understood here in a broad sense.

The polymerization is preferably carried out in a nonpolar solvent. These include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually and as a mixture. Particularly preferred solvents are mineral oils, natural oils and synthetic oils, and also mixtures thereof. Among these, very particular preference is given to mineral oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Mineral oils are also produced in a smaller proportion from raw materials of vegetable (for example from jojoba, rapeseed) or animal (for example neatsfoot oil) origin. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties are attributed. The fraction of n-alkanes in preferred mineral oils is less than 3% by weight, the proportion of O-, N- and/or S-containing compounds less than 6% by weight. The proportion of the aromatics and of the mono-methyl-branched paraffins is generally in each case in the range from 0 to 30% by weight. In one interesting aspect, mineral oil comprises mainly naphthenic and paraffin-base alkanes which have generally more than 13, preferably more than 18 and most preferably more than 20 carbon atoms. The fraction of these compounds is generally $\geq$60% by weight, preferably $\geq$80% by weight, without any intention that this should impose a restriction. An analysis of particularly preferred mineral oils, which was effected by means of conventional processes such as urea separation and liquid chromatography on silica gel shows, for example, the following constituents, the percentages relating to the total weight of the particular mineral oil used:

n-alkanes having from approx. 18 to 31 carbon atoms: 0.7-1.0%,
slightly branched alkanes having from 18 to 31 carbon atoms: 1.0-8.0%,
aromatics having from 14 to 32 carbon atoms: 0.4-10.7%,
iso- and cycloalkanes having from 20 to 32 carbon atoms: 60.7-82.4%,
polar compounds: 0.1-0.8%,
loss: 6.9-19.4%.

Valuable information with regard to the analysis of mineral oils and a list of mineral oils which have a different composition can be found, for example, in Ullmanns's Encyclopedia of Industrial Chemistry, 5th Edition on CD-ROM, 1997, under "lubricants and related products".

Synthetic oils include organic esters, organic ethers such as silicone oils, and synthetic hydrocarbons, especially polyolefins. They are usually somewhat more expensive than the mineral oils, but have advantages with regard to their performance.

Natural oils are animal or vegetable oils, for example neatsfoot oils or jojoba oils.

These oils may also be used as mixtures and are in many cases commercially available.

These solvents are used preferably in an amount of from 1 to 99% by weight, more preferably from 5 to 95% by weight and most preferably from 10 to 60% by weight, based on the total weight of the mixture. The composition may also have polar solvents, although their amount is restricted by the fact that these solvents must not exert any unacceptably disadvantageous action on the solubility of the polymers.

The molecular weights Mw of the polymers are from 5000 to 4 000 000 g/mol, in particular 10 000-2 000 000 g/mol and more preferably 20 000-500 000 g/mol. The polydispersities (Mw/Mn) are preferably in a range of 1.2-7.0. The molecular weights may be determined by known methods. For example, gel permeation chromatography, also known as "size exclusion chromatography" (SEC), may be used. Equally useful for determining the molecular weights is an osmometric process, for example vapor phase osmometry. The processes mentioned are described, for example, in: P. J. Flory, "Principles of Polymer Chemistry" Cornell University Press (1953), Chapter VII, 266-316 and "Macromolecules, an Introduction to Polymer Science", F. A. Bovey and F. H. Winslow, Editors, Academic Press (1979), 296-312 and W. W. Yau, J. J. Kirkland and D. D. Bly, "Modern Size Exclusion Liquid Chromatography", John Wiley and Sons, New York, 1979. To determine the molecular weights of the polymers presented herein, preference is given to using gel permeation chromatography. It should preferably be measured against polymethyl acrylate or polyacrylate standards.

The residual monomer contents (for example C8-C18-alkyl acrylate, MMA, methacrylic acid, NVP) were determined by customary HPLC analysis processes. They are stated either in ppm or % by weight in relation to the total weight of the polymer solutions prepared. It should be mentioned by way of example for acrylates having long-chain alkyl substitution that the residual monomer content stated for C8-C18-alkyl acrylates for example includes all acrylate monomers used which bear alkyl substitutions in the ester side chains, which are characterized in that they contain between 8 and 18 carbon atoms.

The syntheses described in the present invention comprise the preparation of polymer solutions, by prescribing that the syntheses described cannot be undertaken without solvent. The kinematic viscosities specified relate accordingly to the polymer solutions and not the pure, isolated polymers. The term "thickening action" relates to the kinematic viscosity of a polymer solution, which is measured by diluting a certain amount of the polymer solution with a further solvent at a certain temperature. Typically, 10-15% by weight of the polymer solution prepared in each case are diluted in a 150N oil and the kinematic viscosities of the resulting solution are determined at 40° C. and 100° C. The kinematic viscosities are determined by customary processes, for example in an Ubbelohde viscometer or in automatic test apparatus from Herzog. The kinematic viscosity is always specified in mm$^2$/s.

The process for preparing the graft copolymers of the present invention is characterized in that the backbone is prepared in the first step by free-radical polymerization of the monomers a), c) and optionally b) and/or d), and in that a further amount of one or more of the monomers of the formula (I) is then grafted onto the backbone in the second step.

The graft copolymers are thus prepared by using the monomers which possess one or more structural units capable of forming H-bonds and which are H-donors not just in the grafting process but also, in a small fraction, to form the backbone of the graft copolymer, which is often referred to as the polymer backbone. An advantageous procedure may consist, for example, in incorporating 1, 2, 3 or 5% by weight, based on the total weight of the ethylenically unsaturated monomers of the backbone, of a monomer having a group which possesses one or more structural units capable of forming H-bonds and is an H-donor by free-radical polymerization into an acrylate copolymer, and then being followed by a grafting with, for example, a further 1, 2, 3 or 5% by weight of the same monomer or of another compound of the formula (I).

A particularly suitable monomer for use according to the procedure described above is methacrylic acid.

The monomers with H-bond donor functionalities used for grafting, and also the monomers with H-bond donor functionalities already used to form the main polymer chain, need not necessarily correspond. Thus, in accordance with the present invention, polymers can be obtained in which it is optionally also possible to use different monomers with H-bond donor functionalities to form the polymer backbone and/or for the grafting step.

In an advantageous embodiment of the process for preparing graft copolymers, after the grafting of one or more monomers of the formula (I), a further grafting process is carried out with one or more monomers of the formula (IV) which may also optionally be a monomer which need not have structural units capable of forming H-bonds.

It is likewise possible to reverse the above-described sequence of the grafting steps. In this embodiment of the process for preparing graft copolymers, after the polymerization of the backbone, a grafting process is first carried out with one or more monomers of the formula (IV), followed by a further grafting process with one or more monomers of the formula (I).

The present process for preparing the graft copolymers can also be carried out advantageously by carrying out a grafting process using a mixture of in each case one or more monomers of the formulae (I) and (IV).

In a further advantageous embodiment of the present process for preparing graft copolymers, the grafting process is carried out up to 5 times in succession. In this case, a plurality of graftings with in each case a small amount of monomer, for example in each case 1% by weight of a monomer which can act as an H-bond donor, are carried out successively. When, for example, a total of 2% by weight of such a monomer is used for grafting, preference is given to carrying out two successive grafting steps with, for example, in each case 1% by weight of the monomer in question. It is clear to those skilled in the art that, depending on the individual case, it is also possible here to use a number of other values for the amounts of monomer used and for the number of grafting steps, so that they do not have to be listed individually here. It is self-evident that the multiple, up to 5-fold repetition of the grafting step can also be effected with mixtures of the monomers of the formulae (I) and (IV).

The monomer in formula (IV) may be an N-functionalized monomer, preferably an N-vinyl-substituted monomer, for example N-vinylpyrrolidone, N-vinylcaprolactam, N-vinyltriazole, N-vinylbenzotriazole or N-vinylimidazole. In another embodiment, it may also be a vinylpyridine, for example 2-vinylpyridine. It may equally be a methacrylate or acrylate which contains an N-heterocycle in its ester function. In addition, the N-containing monomer may be an N,N-dialkylamino acrylate or its methacrylate analog, where the aminoalkyl groups contain 1-8 carbon atoms. With regard to the further possible compounds, reference is made at this point to the comprehensive list in the definition of the monomers of the formula (IV).

It is possible to use the inventive graft copolymers to produce a concentrate as a lubricant oil additive. The concentrate contains from 15 to 85% by weight of one or more of the graft copolymers. In addition, it is also possible for organic solvents, especially a mineral oil and/or a synthetic oil, to be present in the concentrate.

The inventive graft copolymers are particularly suitable for producing lubricant oil compositions. In this case, the graft copolymers are generally used in an amount in the range from 0.2 to 30% by weight. The lubricant oil compositions may also comprise from 5 to 90% by weight of mineral and/or synthetic base oil and, all together, from 0.2 to 20% by weight of further customary additives, for example pour point depressants, VI improvers, aging stabilizers, detergents, dispersing assistants or wear-reducing components.

In practice, acid-functionalized polymers are often neutralized in polymer-like reactions with amines, polyamines or alcohols; methods for this purpose are disclosed, for example, by DE-A 2519197 (ExxonMobil) and U.S. Pat. No. 3,994,958 (Rohm & Haas Company). Just as in these two applications, the inventive polymers of the present application may subsequently be neutralized or esterified in a polymer-like reaction with primary or secondary amine compounds or alcohols. In this case, a partial or full neutralization of the polymers can be carried out. A full neutralization includes both an esterification of the acid functions present in the backbone and an esterification of the acid functions present in the grafted portion.

In addition to VI, dispersancy and properties not discussed herein, for example oxidation stability, the influence of a lubricant oil on the wear behavior of a machine element is also of particular interest. Wear-reducing additives intended specifically for this purpose are generally added to lubricant oils. Such additives are usually phosphorus- and/or sulfur-containing. In the lubricants industry, there is a drive to reduce the phosphorus and sulfur input into modern lubricant oil formulations. This has both technical (prevention of exhaust gas catalytic converter poisoning) and environmental politics reasons. The search for phosphorus- and sulfur-free lubricant additives has thus become, specifically in the recent past, an intensive research activity of many additives manufacturers.

Advantages in the wear behavior can have a positive effect on the energy consumption, for example of a diesel or gasoline engine. The polymers of the present invention have to date not yet been connected with a positive effect on wear behavior.

The polymers of the present invention are superior to known, commercial polymers with N-functionalities in relation to wear protection.

According to the current state of the art, crankshaft drive, piston group, cylinder bore and the valve control system of an internal combustion engine are lubricated with a motor oil.

This is done by conveying the motor oil which collects in the oil sump of the engine to the individual lubrication points by means of conveying pump through an oil filter (pressure circulation lubrication in conjunction with injection and oil-mist lubrication).

In this system, the motor oil has the functions of: transferring forces, reducing friction, reducing wear, cooling components, and gas sealing of the piston.

The oil is fed under pressure to the bearing points (crankshaft, connection rod and camshaft bearings). The lubrication points of the valve drive, the piston group, gearwheels and chains are supplied with injected oil, spin-off oil or oil mist.

At the individual lubrication points, forces to be transferred, contact geometry, lubrication rate and temperature vary within wide ranges in operation.

The increase in the power density of the engines (kW/capacity; torque/capacity) lead to higher component temperatures and surface pressures of the lubrication points.

To ensure the motor oil functions under these conditions, the performance of a motor oil is tested in standardized test methods and engine tests (for example API classification in the USA or ACEA test sequences in Europe). In addition, test methods self-defined by individual manufacturers are used before a motor oil is approved for use.

Among the abovementioned lubricant oil properties, the wear protection of the motor oil is of particular significance. As an example, the requirement list of the ACEA Test Sequences 2002 shows that, in each category (A for passenger vehicle gasoline engines, B for passenger vehicle diesel engines and E for heavy goods vehicle engines) with a separate engine test, the confirmation of sufficient wear protection for the valve drive is to be conducted.

The oil is exposed to the following stresses in operation:
Contact with hot components (up to above 300° C.)
Presence of air (oxidation), nitrogen oxides (nitration), fuel and its combustion residues (wall condensation, input in liquid form) and soot particles from combustion (input of solid extraneous substances).
At the time of combustion, the oil film on the cylinder is exposed to high radiative heat.
The turbulence generated by the crankshaft drive of the engine creates a large active surface area of the oil in the form of drops in the gas space of the crankshaft drive and gas bubbles in the oil sump.

The listed stresses of evaporation, oxidation, nitration, dilution with fuel and input of particles, owing to the engine operation, change the motor oil itself and components of the engine which are wetted with motor oil in operation. As a consequence, the following undesired effects for the trouble-free operation of the engine arise:
Change in the viscosity (determined in the low-temperature range and at 40° and 100° C.)
Pumpability of the oil at low external temperatures
Deposit formation on hot and cold components of the engine: this is understood to mean the formation of lacquer-like layers (brown to black in color) up to and including the formation of carbon. These deposits impair the function of individual components such as: free passage of the piston rings and narrowing of air-conducting components of the turbocharger (diffuser and spirals). The result may be serious engine damage or power loss and increase in the exhaust gas emissions. In addition, a sludge-like deposit layer forms, preferentially on the horizontal surfaces of the oil space, and in the extreme case can even block oil filters and oil channels of the engine, which can likewise cause engine damage.

The reduction in the deposit formation and the provision of high detergency and dispersancy and also anti-wear action over a long utilization time are of central significance in current clearance procedures, as can be seen by the following example of ACEA test sequences from 1998:
Category A (gasoline engines): In 6 engine test methods, oil deposition is determined 10 times, wear 4 times and viscosity 2 times. In the determination of deposition behavior, piston cleanliness is assessed 3 times, piston ring sticking 3 times and sludge formation 3 times.
Category B (light diesel engines): In 5 engine test methods, oil deposition is determined 7 times, wear 3 times and viscosity 2 times. In the determination of the deposition behavior, piston cleanliness is assessed 4 times, piston ring sticking 2 times and sludge formation once.
Category E (heavy diesel engines heavy duty diesel): In 5 engine test methods, oil deposition is determined 7 times, wear 6 times and viscosity once. In the determination of the deposition behavior, piston cleanliness is assessed 3 times, sludge formation 2 times and turbo deposition once.

For the present invention, the influence of the lubricant used on wear was measured by test method CEC-L-51-A-98. This test method is suitable both for the investigation of the wear behavior in a passenger vehicle diesel engine (ACEA category B) and in a heavy goods vehicle diesel engine (ACEA category E). In these test methods, the circumference profile of each cam is determined in 1° steps on a 2- or 3-D test machine before and after test, and compared. The profile deviation formed in the test corresponds to the cam wear. To assess the tested motor oil, the wear results of the individual cams are averaged and compared with the limiting value of the corresponding ACEA categories.

In a departure from the CEC test method, the test time was shortened from 200 h to 100 h. The investigations performed showed that clear differentiations can be made between the oils used even after 100 h, since significant differences in the wear were detected already after this time.

Oil A (see tables 1 and 2) of the present invention served as the first comparative example for the wear experiment. It was a heavy-duty diesel motor oil formulation of the category SAE 5W-30. As usual in practice, this oil was mixed up from a commercial base oil, in the present case Nexbase 3043 from Fortum, and also further typical additives. The first of these additives is Oloa 4549 from Oronite. The latter component is a typical DI additive for motor oils. In addition to ashless dispersants, the product also comprises components for improving the wear behavior. The latter components in Oloa 4549 are zinc and phosphorus compounds. Zinc and phosphorus compounds can be regarded as the currently most commonly used additives for improving the wear behavior. As a further additive, for the purpose of thickener or VI improver action, an ethylene-propylene copolymer (Paratone 8002 from Oronite) was used. As usual in practice, Paratone 8002 was used as a solution in a mineral oil. Even though their VI action is limited, ethylene-propylene copolymers are currently the most common VI improvers in passenger vehicle and heavy goods vehicle motor oils owing to their good thickening action. A noticeable wear-improving action has not been described to date for such systems. A polyacrylate was not used as an additive component for oil A. In summary, oil A was composed of 75.3% by weight of Nexbase 3043, 13.2% by weight of Oloa 4594 and 11.5% by weight of a solution of Paratone 8002.

TABLE 1

Wear results to CEC-L-51-A-98, obtained with oils A-C

| Oil | Content of Paratone 8002 | Polyacrylate in each case 3% by wt. | CEC-L-51-A-98, mean cam wear after 100 h [μm] |
|---|---|---|---|
| A | 11.5% by wt. | — | 47.4 |
| B | 8.5% by wt. | Example 1 | 23.9 |
| C | 8.5% by wt. | Example 3 | 3.9 |

TABLE 2

Rheological data and TBN values of the formulations used for the wear tests

| Oil | Content of Paratone 8002 [% by wt.] | Polyacrylate in each case 3% by wt. | KV40° C. | KV100° C. | VI | TBN | CCS | HTHS |
|---|---|---|---|---|---|---|---|---|
| A | 11.5 | — | | 11.38 | | | | |
| B | 8.5 | Example 1 | 67.07 | 11.91 | 176 | 9.1 | 4621 | 3.41 |
| C | 8.5 | Example 3 | 62.88 | 11.46 | 180 | 9.3 | 4406 | 3.35 |

As is evident from table 2, all formulations used for the wear experiments essentially do not differ with regard to their kinematic viscosity data. This can be seen with reference to the kinematic viscosities measured at 40 and 100° C. (denoted in table 2 as KV40° C. and KV100° C. respectively). Table 2 likewise shows that the formulations used do not differ markedly with regard to viscosity index (VI), total base number (TBN), cold-start behavior expressed by crank case simulator data (CCS), and temporary shear losses at high temperatures expressed by high-temperature high-shear data (HTHS). The KV40° C., KV100° C., VI, TBN, CCS and HTHS data were determined by the ASTM methods known to those skilled in the art.

With regard to corrosion behavior and oxidation resistance, no noticeable differences of the inventive formulations compared to the comparative examples were recognizable. By way of example, the inventive formulations B and C were examined with regard to their corrosion behavior in direct comparison with oil A (see table 3). These examinations were carried out to ASTM D 5968 for lead, copper and tin, and to ASTM D 130 for copper.

TABLE 3

Corrosion behavior of formulations used for wear tests

| | | Corrosion | | | |
|---|---|---|---|---|---|
| | | ASTM D 5968 | | | ASTM D 130 |
| Oil | Polyacrylate | Pb | Cu | Sn | Cu |
| A | — | 109.5 | 4 | 0 | 1b |
| B | Example 1 | 130.0 | 4 | 0 | 1b |
| C | Example 3 | 77.0 | 4.5 | 0 | 1b |

The oxidation behavior was determined using the PDSC method known to those skilled in the art (CEC L-85-T-99).

It was common to oils B and C that 3% by weight of the Paratone 8002 solution in each case was replaced by 3% by weight of the particular polyacrylate solution. Oils B and C are the inventive formulations with regard to wear behavior. It is clear that, in particular, a formulation which comprises a polymer from example 3 is to be considered as particularly advantageous with regards to wear protection (see table 1). The mean cam wear at 3.9 μm was particularly low here compared to the comparative formulations. The polymer from example 1 which is simple to prepare was found to be improved over the prior art, indicated by a comparison in the cam wear compared to values determined for oil A.

Suitable base oils for the preparation of an inventive lubricant oil formulation are in principle any compound which ensures a sufficient lubricant film which does not break even at elevated temperatures. To determine this property, it is possible, for example, to use the viscosities, as laid down, for example, in the SAE specifications.

Particularly suitable compounds include those which have a viscosity which is in the range from 15 Saybolt seconds (SUS, Saybolt Universal Seconds) to 250 SUS, preferably in the range from 15 to 100 SUS, in each case determined at 100° C.

The compounds suitable for this purpose include natural oils, mineral oils and synthetic oils, and also mixtures thereof.

Natural oils are animal or vegetable oils, for example neatsfoot oils or jojoba oils. Mineral oils are obtained mainly by distillation of crude oil. They are advantageous especially with regard to their favorable cost. Synthetic oils include organic esters, synthetic hydrocarbons, especially polyolefins, which satisfy the abovementioned requirements. They are usually somewhat more expensive than the mineral oils, but have advantages with regard to their performance.

These base oils may also be used in the form of mixtures and are in many cases commercially available.

In addition to the base oil and the polymers mentioned herein, which already make contributions to the dispersion behavior and to the wear protection, lubricant oils generally comprise further additives. This is the case especially for motor oils, gearbox oils and hydraulic oils. The additives suspend solids (detergent-dispersant behavior), neutralize acidic reaction products and form a protective film on the cylinder surface (EP additive, "extreme pressure"). In addition, friction-reducing additives such as friction modifiers, aging protectants, pour point depressants, corrosion protectants, dyes, demulsifiers and odorants are used. Further valuable information can be found by those skilled in the art in Ullmanns's Encyclopedia of Industrial Chemistry, Fifth Edition on CD-ROM, 1998 edition. The inventive polymers of the present invention may, owing to their contribution to wear protection, ensure sufficient wear protection even in the absence of a friction modifier or of an EP additive. The wear-improving action is then contributed by the inventive polymer, to which friction modifier action could therefore be attributed.

The amounts in which abovementioned additives are used are dependent upon the field of use of the lubricant. In general, the proportion of the base oil is between 25 to 90% by weight, preferably from 50 to 75% by weight. The additives may also be used in the form of DI packages (detergent-inhibitor) which are widely known and can be obtained commercially.

Particularly preferred motor oils comprise, in addition to the base oil, for example,
0.1-1% by weight of pour point depressants,
0.5-15% by weight of VI improvers,
0.4-2% by weight of aging protectants,
2-10% by weight of detergents,
1-10% by weight of lubricity improvers,
0.0002-0.07% by weight of antifoams,
0.1-1% by weight of corrosion protectants
from 1 to 10% by weight of dispersing components.

The inventive lubricant oil may, as well as the base oil described above, additionally, preferably in a concentration of 0.05-10.0 percent by weight, comprise an alkyl alkoxylate of the formula (V). The alkyl alkoxylate may be added to the lubricant oil composition directly, as a constituent of the VI improver, as a constituent of the DI package, as a constituent of a lubricant concentrate or subsequently to the oil. The oil used here may also be processed used oils.

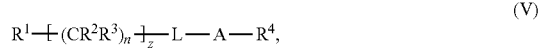

in which
$R^1$, $R^2$ and $R^3$ are each independently hydrogen or a hydrocarbon radical having up to 40 carbon atoms,
$R^4$ is hydrogen, a methyl or ethyl radical,
L is a linking group,
n is an integer in the range from 4 to 40,
A is an alkoxy group having from 2 to 25 repeat units which are derived from ethylene oxide, propylene oxide and/or butylene oxide, where A includes homopolymers and also random copolymers of at least two of the aforementioned compounds, and
z is 1 or 2,
where the nonpolar part of the compound (V) of the formula (VI)

contains at least 9 carbon atoms. These compounds are referred to in the context of the invention as alkyl alkoxylates. These compounds may be used either individually or as a mixture.

Hydrocarbon radicals having up to 40 carbon atoms shall be understood to mean, for example, saturated and unsaturated alkyl radicals which may be linear, branched or cyclic, and also aryl radicals which may also comprise heteroatoms and alkyl substituents, which may optionally be provided with substituents, for example halogens.

Among these radicals, preference is given to $(C_1-C_{20})$-alkyl, in particular $(C_1-C_8)$-alkyl and very particularly $(C_1-C_4)$-alkyl radicals.

The term "$(C_1-C_4)$-alkyl" is understood to mean an unbranched or branched hydrocarbon radical having from 1 to 4 carbon atoms, for example the methyl, ethyl, propyl, isopropyl, 1-butyl, 2-butyl, 2-methylpropyl or tert-butyl radical;

the term "$(C_1-C_8)$-alkyl" the aforementioned alkyl radicals, and also, for example, the pentyl, 2-methylbutyl, hexyl, heptyl, octyl, or the 1,1,3,3-tetramethylbutyl radical;

the term "$(C_1-C_{20})$-alkyl" the aforementioned alkyl radicals, and also, for example, the nonyl, 1-decyl, 2-decyl, undecyl, dodecyl, pentadecyl or eicosyl radical.

In addition, $(C_3-C_8)$-cycloalkyl radicals are preferred as the hydrocarbon radical. These include the cyclopropyl, cyclobutyl, cyclopentyl, cyclohexyl, cycloheptyl or cyclooctyl group.

In addition, the radical may also be unsaturated. Among these radicals, preference is given to "$(C_2-C_{20})$-alkenyl", "$(C_2-C_{20})$-alkynyl" and in particular to "$(C_2-C_4)$-alkenyl" and "$(C_2-C_4)$-alkynyl". The term "$(C_2-C_4)$-alkenyl" is understood to mean, for example, the vinyl, allyl, 2-methyl-2-propenyl or 2-butenyl group;

the term "$(C_2-C_{20})$-alkenyl" the aforementioned radicals and also, for example, the 2-pentenyl, 2-decenyl or the 2-eicosenyl group;

the term "$(C_2-C_4)$-alkynyl", for example, the ethynyl, propargyl, 2-methyl-2-propynyl or 2-butynyl group;

the term "$(C_2-C_{20})$-alkenyl" the aforementioned radicals, and also, for example, the 2-pentynyl or the 2-decynyl group.

In addition, preference is given to aromatic radicals such as "aryl" or "heteroaromatic ring systems". The term "aryl" is understood to mean an isocyclic aromatic radical having preferably from 6 to 14, in particular from 6 to 12 carbon atoms, for example phenyl, naphthyl or biphenylyl, preferably phenyl;

the term "heteroaromatic ring system" is understood to mean an aryl radical in which at least one CH group has been replaced by N and/or at least two adjacent CH groups have been replaced by S, NH or O, for example a radical of thiophene, furan, pyrrole, thiazole, oxazole, imidazole, isothiazole, isoxazole, pyrazole, 1,3,4-oxadiazole, 1,3,4-thiadiazole, 1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, pyrazine, pyrimidine, pyridazine, 1,3,5-triazine, 1,2,4-triazine, 1,2,4,5-triazine, quinoline, isoquinoline, quinoxaline, cinnoline, 1,8-naphthyridine, 1,5-naphthyridine, 1,6-naphthyridine, 1,7-naphthyridine, phthalazine, pyridopyrimidine, purine, pteridine or 4H-quinolizine.

The $R^2$ or $R^3$ radicals which may occur repeatedly in the hydrophobic moiety of the molecule may each be the same or different.

The linking L group serves to join the polar alkoxide moiety to the nonpolar alkyl radical. Suitable groups include, for example, aromatic radicals such as phenoxy (L=—$C_6H_4$—O—), radicals derived from acids, for example ester groups (L=—CO—O—), carbamate groups (L=—NH—CO—O—) and amide groups (L=—CO—NH—), ether groups (L=—O—) and keto groups (L=—CO—). Preference is given here to particularly stable groups, for example the ether, keto and aromatic groups.

As mentioned above, n is an integer in the range from 4 to 40, in particular in the range from 10 to 30. If n is greater than 40, the viscosity which is generated by the inventive additive generally becomes too great. If n is less than 4, the lipophilicity of the molecular moiety is generally insufficient to keep the compound of the formula (V) in solution. Accordingly, the nonpolar moiety of the compound (V) of the formula (VI)

contains preferably a total of from 10 to 100 carbon atoms and most preferably a total of from 10 to 35 carbon atoms.

The polar moiety of the alkyl alkoxylate is illustrated by A in formula (V). It is assumed that this moiety of the alkyl alkoxylate can be illustrated by the formula (VII)

(VII)

in which the $R^5$ radical is hydrogen, a methyl radical and/or ethyl radical, and m is an integer in the range form 2 to 40, preferably from 2 to 25, in particular 2 and 15, and most preferably from 2 to 5. In the context of the present invention, the aforementioned numerical values are to be understood as mean values, since this moiety of the alkyl alkoxylate is generally obtained by polymerization. If m is greater than 40, the solubility of the compound in the hydrophobic environment is too low, so that there is opacity in the oil, in some cases precipitation. When the number is less than 2, the desired effect cannot be ensured.

The polar moiety may have units which are derived from ethylene oxide, from propylene oxide and/or from butylene oxide, preference being given to ethylene oxide. In this context, the polar moiety may have only one of these units. These units may also occur together randomly in the polar radical.

The number z results from the selection of the connecting group, and from the starting compounds used. It is 1 or 2.

The number of carbon atoms of a nonpolar moiety of the alkyl alkoxylate of the formula (VI) is preferably greater than the number of carbon atoms of the polar moiety A, probably of the formula (VII), of this molecule. The nonpolar moiety preferably comprises at least twice as many carbon atoms as the polar moiety, more preferably three times the number or more.

Alkyl alkoxylates are commercially available. These include, for example, the ®Marlipal and ®Marlophen types from Sasol and the ®Lutensol types from BASF.

These include, for example, ®Marlophen NP 3 (nonylphenol polyethylene glycol ether (3EO)), ®Marlophen NP 4 (nonylphenol polyethylene glycol ether (4EO)), ®Marlophen NP 5 (nonylphenol polyethylene glycol ether (5EO)), ®Marlophen NP 6 (nonylphenol polyethylene glycol ether (6EO));
®Marlipal 1012/6 ($C_{10}$-$C_{12}$ fatty alcohol polyethylene glycol ether (6EO)), ®Marlipal MG ($C_{12}$ fatty alcohol polyethylene glycol ether), ®Marlipal 013/30 ($C_{13}$ oxo alcohol polyethylene glycol ether (3EO)), ®Marlipal 013/40 ($C_{13}$ oxo alcohol polyethylene glycol ether (4EO));
®Lutensol TO 3 (i-$C_{13}$ fatty alcohol with 3 EO units), ®Lutensol TO 5 (i-$C_{13}$ fatty alcohol with 5 EO units), ®Lutensol TO 7 (i-$C_{13}$ fatty alcohol with 7 EO units), Lutensol TO 8 (i-$C_{13}$ fatty alcohol with 8 EO units) and Lutensol TO 12 (i-$C_{13}$ fatty alcohol with 12 EO units).

EXAMPLES

Comparative examples 1-3 of the present invention, which are intended to be representative of those synthesis attempts which failed, lead to reaction products which are characterized in that a portion of the polymers formed precipitates out of the polymer solution actually in solid form.

The preparation according to example 1) provides a homogeneous polymer solution with clear appearance. When the grafting process is carried out analogously, i.e. with 2% by weight of methacrylic acid under the same process conditions but without having used a small amount of methacrylic acid beforehand to form the polymer backbone, an inhomogeneous polymer solution with cloudy appearance is obtained (see comparative example 3). Even in the case of grafting with only 1% by weight of methacrylic acid, an inhomogeneous reaction product is obtained (see comparative example 1). It is therefore no surprise that grafting with 3% by weight of methacrylic acid without having incorporated a certain fraction of this species into the polymer backbone beforehand likewise leads to a highly cloudy product, which is characterized in that solid constituents precipitate actually out of the solution (see comparative example 2). This is also the case when attempts are made to react the 3% by weight of methacrylic acid in a grafting process not all at once but rather gradually, for example in portions of 1% by weight each. Interestingly, it is conveniently possible to prepare a copolymer with 3% by weight of methacrylic acid which have been polymerized randomly into the polymer and not by means of a grafting step.

Just like carboxylic acids, acid amides are known for their simultaneous possible action as both H-bond donors and H-bond acceptors. In analogy to example 1, in which methacrylic acid was selected as the monomer type with H-bond donor function, example 4 of the present invention describes a polymer in which dimethylaminopropylmethacrylamide (DMAPMAM) is present both in the polymer backbone and in the grafted fraction. The process detailed in example 4 leads to a homogeneous polymer solution of clear appearance and demonstrates that the synthesis principle presented herein is of universal character, i.e. can be applied not just to carboxylic acid derivatives but also, for example, to acid amides.

The monomers with H-bond donor functionalities used for grafting and the monomers with H-bond donor functionalities already used to form the main polymer chain need not necessarily correspond. Thus, the present invention includes polymers in which mixtures of different monomers with H-bond donor functionalities are used to form the polymer backbone and/or for the grafting step. Example 2 describes a polymer synthesis in which 1% by weight of methacrylic acid is incorporated into the polymer backbone and a further 2% by weight of the same species, followed by 3% by weight of DMAPMAM, are present in the grafted fraction.

In addition to a grafting with a monomer having H-bond donor function, it is possible to carry out further graftings with other monomer types. To this end, the N- or O-containing monomer types with dispersing action mentioned at the outset are used with preference. The latter monomers are characterized in that their N- or O-containing functionality is generally an H-bond acceptor function. An additional grafting with such a monomer may either follow the grafting process with the monomer which possesses H-bond donor function or precede it. It is equally possible to perform graftings with monomer mixtures which, as well as monomers with H-bond donor functionalities, additionally contain the abovementioned monomers by the inventive polymerization process. Example 3 of the present invention encompasses a polymer synthesis in which 1% by weight of methacrylic acid has been used to form the backbone by the process according to the invention, then grafted twice with a further 1% by weight of methacrylic acid in each case by the process according to the invention and then finally followed by a grafting step with 3% by weight of N-vinylpyrrolidone. In this case too, a homogeneous reaction product, characterized by a clear solution, is contained.

It is clear that, in particular, a formulation which comprises a polymer from example 3 is to be considered as particularly advantageous in relation to wear protection. The mean cam wear at 3.9 µm was particularly low here compared to the comparative formulations. The copolymers from example 1 which are simple to prepare were found to be improved over the prior art, indicated by a comparison in the cam wear compared to values determined with oil A.

Products and Starting Materials Used:

The starting materials such as initiators or chain transferrers used for the polymer syntheses described herein were entirely commercial products, as obtainable, for example, from Aldrich or Akzo Nobel. Monomers, for example MMA (Degussa), NVP (BASF), DMAPMAM (Degussa), 10-undecenoic acid (Atofina) or methacrylic acid (Degussa) were likewise obtained from commercial sources. Plex 6844-0 was a methacrylate containing urea in the ester radical from Degussa.

For other monomers used herein, for example C8-C18-alkyl methacrylates or ethoxylated methacrylates, reference is made to the description of the present application. This is equally true for the more precise description of the solvents used, for example oils or alkyl alkoxylates.

Explanations of Terms, Test Methods

When an acrylate or, for example, an acrylate polymer or polyacrylate is discussed in the present invention, this is understood to mean not only acrylates, i.e. derivatives of acrylic acid, but also methacrylates, i.e. derivatives of methacrylic acid, or else mixtures of systems based on acrylate and methacrylate.

When a polymer is referred to as a random polymer in the present application, this means a copolymer in which the monomer types used are distributed randomly in the polymer chain. Graft copolymers, block copolymers or systems with a concentration gradient of the monomer types used along the polymer chain are referred to in this context as non-random polymers or non-randomly structured polymers.

The term "grafted fraction" relates to the fraction of the polymer which is attached subsequently, i.e. after completion of polymerization of the polymer backbone, covalently to this finished polymer backbone. It should be pointed out that this does not give any information about the structure of the end products, expressed by the number, size and the precise covalent attachment points of the grafted fractions. However, the statement that all polymers described herein with grafted fractions have a non-random structure does apply.

Polymer Syntheses

Comparative Example 1

Failed Grafting of 1% by Weight of Methacrylic Acid onto a Polyacrylate

A 2 liter four-neck flask equipped with saber stirrer (operated at 150 revolutions per minute), thermometer and reflux condenser is initially charged with 430 g of a 150N oil and 47.8 g of a monomer mixture consisting of C12-C18-alkyl methacrylate and methyl methacrylate in a weight ratio of 85.0/15.0. The temperature is adjusted to 100° C. After 100° C. has been attained, 0.38 g of tert-butyl peroctoate is added and, at the same time, a feed of 522.2 g of a mixture consisting of C12-C18-alkyl methacrylate and methyl methacrylate in a weight ratio of 85.0/15.0 together with 2.09 g of tert-butyl peroctoate is started. The feed time is 3.5 hours and the feed rate is uniform. Two hours after the feeding has ended, another 1.14 g of tert-butyl peroctoate are added. The total reaction time is 8 hours. Thereafter, 4.3 g of 150N oil, 5.7 g of methacrylic acid and 1.45 g of tert-butyl peroctoate are added at 100° C. One hour after this addition, 0.72 g of tert-butyl peroctoate is then added once again three times at a separation of one hour each time. The total reaction time after addition of the methacrylic acid is 8 hours. A cloudy reaction product of inhomogeneous appearance, which is characterized in that polymeric fractions have already precipitated out of the liquid phase in solid form, is obtained.

Comparative Example 2

Failed Grafting of 3% by Weight of Methacrylic Acid onto a Polyacrylate

A 2 liter four-neck flask equipped with saber stirrer (operated at 150 revolutions per minute), thermometer and reflux condenser is initially charged with 430 g of a 150N oil and 47.8 g of a monomer mixture consisting of C12-C18-alkyl methacrylate and methyl methacrylate in a weight ratio of 85.0/15.0. The temperature is adjusted to 100° C. After 100° C. has been attained, 0.38 g of tert-butyl peroctoate is added and, at the same time, a feed of 522.2 g of a mixture consisting of C12-C18-alkyl methacrylate and methyl methacrylate in a weight ratio of 85.0/15.0 together with 2.09 g of tert-butyl peroctoate is started. The feed time is 3.5 hours and the feed rate is uniform. Two hours after the feeding has ended, another 1.14 g of tert-butyl peroctoate are added. The total reaction time is 8 hours. Thereafter, 13.17 g of 150N oil, 17.45 g of methacrylic acid and 1.45 g of tert-butyl peroctoate are added at 100° C. One hour after this addition, 0.73 g of tert-butyl peroctoate each time is then added once again three times at a separation of one hour each time. The total reaction time after addition of the methacrylic acid is 8 hours. A very cloudy reaction product of inhomogeneous appearance, which is characterized in that polymeric fractions have already precipitated out of the liquid phase in solid form, is obtained.

Comparative Example 3

Failed Grafting of 2% by Weight of Methacrylic Acid onto a Polyacrylate

A 2 liter four-neck flask equipped with saber stirrer (operated at 150 revolutions per minute), thermometer and reflux condenser is initially charged with 430 g of a 150N oil and 47.8 g of a monomer mixture consisting of C12-C18-alkyl methacrylate and methyl methacrylate in a weight ratio of 85.0/15.0. The temperature is adjusted to 100° C. After 100° C. has been attained, 0.38 g of tert-butyl peroctoate is added and, at the same time, a feed of 522.2 g of a mixture consisting of C12-C18-alkyl methacrylate and methyl methacrylate in a weight ratio of 85.0/15.0 together with 2.09 g of tert-butyl peroctoate is started. The feed time is 3.5 hours. The feed rate is uniform. Two hours after the feeding has ended, another 1.14 g of tert-butyl peroctoate are added. The total reaction time is 8 hours. Thereafter, 8.68 g of 150N oil, 11.52 g of methacrylic acid and 1.45 g of tert-butyl peroctoate are added at 100° C. One hour after this addition, 0.72 g of tert-butyl peroctoate each time is then added once again three times at a separation of one hour each time. The total reaction time after addition of the methacrylic acid is 8 hours. An opaque reaction product of inhomogeneous appearance, which is characterized in that polymeric fractions have already precipitated out of the liquid phase in solid form, is obtained.

Example 1

Polyacrylate with 1% by Weight of Methacrylic Acid in the Polymer Backbone and 2% by Weight of Methacrylic Acid in the Grafted Fraction

A 2 liter four-neck flask equipped with saber stirrer (operated at 150 revolutions per minute), thermometer and reflux condenser was initially charged with 430 g of 150N oil and 47.8 g of a monomer mixture of C12-C18-alkyl methacrylate, methyl methacrylate and methacrylic acid in a weight ratio of 84.0/15.0/1.0. The temperature is adjusted to 100° C. After the 100° C. has been attained, 0.80 g of tert-butyl peroctoate is added and, at the same time, a feed of 522.2 g of a monomer mixture consisting of C12-C18-alkyl methmethacrylate, methyl methacrylate, methacrylic acid in a weight ratio of 84.0/15.0/1.0 together with 4.44 g of tert-butyl peroctoate is started. The feed time is 3.5 hours and the feed rate is uniform. Two hours after the feeding has ended, another 1.14 g of tert-butyl peroctoate are added. The total reaction time is 8 hours. Thereafter, 8.69 g of 150N oil, 5.76 g of methacrylic acid and 0.72 g of tert-butyl peroctoate are added at 100° C. One hour thereafter, another 5.76 g of methacrylic acid and 0.72 g of tert-butyl peroctoate are added. The total reaction time is 8 hours. A reaction product of homogeneous appearance is obtained.

Kinematic viscosity at 100° C.: 3764 mm$^2$/s
Thickening action at 100° C. (10% in a 150N oil): 11.14 mm$^2$/s
Thickening action at 40° C. (10% in a 150N oil): 59.6.0 mm$^2$/s
C12-C18-Alkyl methacrylate residual monomer content: 0.51%
MMA residual monomer content: 0.036%
Methacrylic acid residual monomer content: 0.072%

Example 2

Polyacrylate with 1% by Weight of Methacrylic Acid in the Polymer Backbone and 2% by Weight of Methacrylic Acid and 3% by Weight of DMAPMAM in the Grafted Fraction

A 2 liter four-neck flask equipped with saber stirrer (operated at 150 revolutions per minute), thermometer and reflux condenser is initially charged with 430 g of a 150N oil and 47.8 g of a monomer mixture consisting of C12-C18-alkyl methacrylate, methyl methacrylate and methacrylic acid in a weight ratio of 84.0/15.0/1.0. The temperature is adjusted to 100° C. After the 100° C. has been attained, 0.75 g of tert-butyl peroctoate is added and, at the same time, a feed of 522.2 g of a mixture consisting of C12-C18-alkyl methacrylate, methyl methacrylate and methacrylic acid in a weight ratio of 84.0/15.0/1.0 together with 4.17 g of tert-butyl peroctoate is started. The feed time is 3.5 hours and the feed rate is uniform. Two hours after the feeding has ended, another 1.14 g of tert-butyl peroctoate are added. The total reaction time is 8 hours. Thereafter, 8.69 g of 150N oil, 5.76 g of methacrylic acid and 0.72 g of tert-butyl peroctoate are added at 100° C. One hour thereafter, 5.76 g of methacrylic acid and 0.72 g of tert-butyl peroctoate are added. After a further hour, 13.43 g of 150N oil, 17.81 g of dimethylaminopropyl-methacrylamide (DMAPMAM) and 1.48 g of tert-butyl peroctoate are added. One hour and 2 hours thereafter, another 0.74 g of tert-butyl peroctoate each time is added. The total reaction time is 8 hours. A reaction product of homogeneous appearance is obtained.

Kinematic viscosity of the polymer solution at 100° C.: 3634 mm$^2$/s
Thickening action at 100° C. (10% in a 150N oil): 11.21 mm$^2$/s
Thickening action at 40° C. (10% in a 150N oil): 60.63 mm$^2$/s
C12-C18-Alkyl methacrylate residual monomer content: 0.444%
MMA residual monomer content: 0.035%
Methacrylic acid residual monomer content: 98 ppm

Example 3

Polyacrylate with 1% by Weight of Methacrylic Acid in the Polymer Backbone and 2% by Weight of Methacrylic Acid and 3% by Weight of NVP in the Grafted Fraction

A 2 liter four-neck flask equipped with saber stirrer (operated at 150 revolutions per minute), thermometer and reflux condenser is initially charged with 430 g of 150N oil and 47.8 g of a monomer mixture of C12-C18-alkyl methacrylate, methyl methacrylate and methacrylic acid in a weight ratio of 84.0/15.0/1.0. The temperature is adjusted to 100° C. After the 100° C. has been attained, 0.94 g of tert-butyl peroctoate is added and, at the same time, a feed of 522.2 g of a mixture of C12-C18-alkyl methacrylate, methyl methacrylate and methacrylic acid in a weight ratio of 84.0/15.0/1.0 together with 5.22 g of tert-butyl peroctoate is started. The feed time is 3.5 hours and the feed rate is uniform. Two hours after the feeding has ended, another 1.14 g of tert-butyl peroctoate are added. The total reaction time is 8 hours.

Thereafter, 8.69 g of 150N oil, 5.76 g of methacrylic acid and 0.72 g of tert-butyl peroctoate are added at 100° C. One hour thereafter, another 5.76 g of methacrylic acid and 0.72 g of tert-butyl peroctoate are added. After a further hour, the mixture is heated to 130° C. Once 130° C. has been attained, 13.43 g of 150N oil, 17.81 g of N-vinylpyrrolidone (NVP) and 1.48 g of tert-butyl perbenzoate are added. One hour and 2 hours thereafter, another 0.74 g of tert-butyl perbenzoate each time is added. The total reaction time of the 3 grafting steps overall is 8 hours. A clear reaction product of homogeneous appearance is obtained.

Specific viscosity (20° C. in chloroform): 36.5 ml/g
Kinematic viscosity at 100° C.: 3584 mm$^2$/s
Thickening action at 100° C. (10% in a 150N oil): 11.02 mm$^2$/s
Thickening action at 40° C. (10% in a 150N oil): 59.60 mm$^2$/s
C12-C18-Alkyl methacrylate residual monomer content: 0.064%
MMA residual monomer content: 45 ppm
Methacrylic acid residual monomer content: 9.5 ppm
N-Vinylpyrrolidone residual monomer content: 0.045%

Example 4

Polyacrylate with 1% by Weight of DMAPMAM in the Polymer Backbone and 2% by Weight of DMAPMAM in the Grafted Fraction

A 2 liter four-neck flask equipped with saber stirrer (operated at 150 revolutions per minute), thermometer and reflux condenser is initially charged with 430 g of 150N oil and 47.8 g of a monomer mixture of C12-C18-alkyl methacrylate, methyl methacrylate and DMAPMAM in a weight ratio of 84.0/15.0/1.0. The temperature is adjusted to 100° C. After the 100° C. had been attained, 0.80 g of tert-butyl peroctoate are added and, at the same time, a feed of 522.2 g of a monomer mixture of C12-C18-alkyl methmethacrylate, methyl methacrylate and DMAPMAM in a weight ratio of 84.0/15.0/1.0, together with 4.44 g of tert-butyl peroctoate is started. The feed time is 3.5 hours and the feed rate is uniform. Two hours after the feeding has ended, a further 1.14 g of tert-butyl peroctoate are added. The total reaction time is 8 hours. Thereafter, 8.69 g of 150N oil, 5.76 g of DMAPMAM and 0.72 g of tert-butyl peroctoate are added at 100° C. One hour thereafter, another 5.76 g of DMAPMAM and 0.72 g of tert-butyl peroctoate are added. The total reaction time is 8 hours. A reaction product of homogeneous appearance is obtained.

What is claimed is:

1. A graft copolymer, comprising:
a polymer backbone; and
at least one graft copolymer grafted to the polymer backbone;
wherein
the backbone comprises free-radically polymerized units of
a) from 0.01 to 15% by weight of a compound of formula (I)

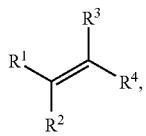

(I)

wherein
$R^1$, $R^2$ and $R^3$ are each independently hydrogen or an alkyl group having from 1 to 5 carbon atoms and $R^4$ is a group which has one or more structural units capable of forming hydrogen bonds and is a hydrogen donor, wherein the structural units are selected from the group consisting of a carboxylic acid group, a hydroxyl group, an optionally mono-substituted carboxamide group and a carboxamide substituted by a dialkylaminoalkyl group, wherein the compound of formula (I) is selected from the group consisting of acrylic acid, methacrylic acid, 1-[2-(isopropenylcarbonyloxy)ethyl]maleate (monoester of 2-hydroxyethyl methacrylate (HEMA) and maleic acid), 1-[2-(vinylcarbonyloxy)ethyl]maleate (monoester of 2-hydroxyethyl acrylate (HEA) and maleic acid), 1-[2-(isopropenylcarbonyloxy)ethyl]succinate (monoester of HEMA and succinic acid), 1-[2-(vinylcarbonyloxy)ethyl]succinate (monoester of HEA and succinic acid), 1-[2-(isopropenylcarbonyloxy)-ethyl]phthalate (monoester of HEMA and phthalic acid), 1-[2-(vinylcarbonyloxy)ethyl]phthalate (monoester of HEA and phthalic acid), 1-[2-(isopropenylcarbonyloxy)-ethyl]hexahydrophthalate (monoester of HEMA and hexahydrophthalic acid), 1-[2-(vinylcarbonyloxy)ethyl]-hexahydrophthalate (monoester of HEA and hexahydro-phthalic acid), 1-[2-(isopropenylcarbonyloxy)butyl]-maleate (monoester of 2-hydroxybutyl methacrylate (HBMA) and maleic acid), 1-[2-(vinylcarbonyloxy)butyl]-maleate (monoester of 2-hydroxybutyl acrylate (HBA) and maleic acid), 1-[2-(isopropenylcarbonyloxy)butyl]-succinate (monoester of HBMA and succinic acid), 1-[2-(vinylcarbonyloxy)butyl]succinate (monoester of HBA and succinic acid), 1-[2-(isopropenylcarbonyloxy)butyl]-phthalate (monoester of HBMA and phthalic acid), 1-[2-(vinylcarbonyloxy)butyl]phthalate (monoester of HBA and phthalic acid), 1-[2-(isopropenylcarbonyloxy)butyl]-hexahydrophthalate (monoester of HBMA and hexahydrophthalic acid), 1-[2-(vinylcarbonyloxy)butyl]hexahydro-phthalate (monoester of HBA and hexahydrophthalic acid), fumaric acid, methylfumaric acid, monoesters of fumaric acid or their derivatives, maleic acid, methylmaleic acid, monoesters of maleic acid or their derivatives, crotonic acid, itaconic acid, acrylamidoglycolic acid, methacrylamidobenzoic acid, cinnamic acid, vinylacetic acid, trichloroacrylic acid, 10-hydroxy-2-decenoic acid, 4-methacryloyloxyethyl-trimethyl acid, and styrenecarboxylic acid, b) from 0 to 40% by weight of one or more (meth)acrylates of formula (II)

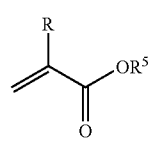

(II)

in which R is hydrogen or methyl and $R^5$ is a linear or branched alkyl radical having from 1 to 5 carbon atoms, c) from 35 to 99.99% by weight of one or more ethylenically unsaturated ester compounds of formula (III)

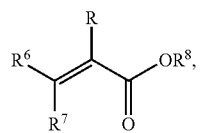

(III)

in which R is hydrogen or methyl, $R^8$ is a linear, cyclic or branched alkyl radical having from 6 to 40 carbon atoms, $R^6$ and $R^7$ are each independently hydrogen or a group of the formula —$COOR^{18}$ where $R^{18}$ is hydrogen or a linear, cyclic or branched alkyl radical having from 6 to 40 carbon atoms, and d) from 0 to 40% by weight of one or more comonomers, where the percentage by weight of the above components is based on the total weight of the ethylenically unsaturated monomers of the backbone and, grafted onto the backbone of the copolymer, a graft copolymer, comprising:

a') from 0.01 to 25% by weight, based on the total weight of the copolymer, of a compound of formula (I)

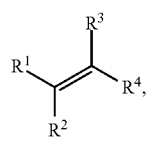

(I)

wherein $R^1$, $R^2$, $R^3$ and $R^4$ are as described above, and b') from 0 to 20% by weight, based on the total weight of the copolymer, of one or more compounds of formula (IV)

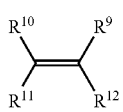 (IV)

in which $R^9$, $R^{10}$ and $R^{11}$ may each independently be hydrogen or an alkyl group having from 1 to 5 carbon atoms and $R^{12}$ is either a $C(O)OR^{13}$ group wherein $R^{13}$ is a linear or branched alkyl radical which is substituted by at least one —$NR^{14}R^{15}$ group and has from 2 to 20 carbon atoms, where $R^{14}$ and $R^{15}$ are each independently hydrogen, an alkyl radical having from 1 to 20 carbon atoms, and where $R^{14}$ and $R^{15}$, including the nitrogen atom and, if present, an additional nitrogen or oxygen atom, form a 5- or 6-membered ring which may optionally be substituted by $C_1$-$C_6$-alkyl, or $R^{12}$ is an $NR^{16}C(=O)R^{17}$ group wherein $R^{16}$ and $R^{17}$ together form an alkylene group having from 2 to 6 carbon atoms, where they form a 4- to 8-membered saturated or unsaturated ring, optimally including an additional nitrogen or oxygen atom, where this ring may also optionally be substituted by $C_1$-$C_6$-alkyl; and c') one or more ethylenic monomers not having structural units capable of forming H-bonds.

2. The graft copolymer as claimed in claim 1, wherein a weight-average molecular weight is 5000-4,000,000 g/mol.

3. The graft copolymer as claimed in claim 1, wherein from 10 to 80% by weight of the total weight of monomer of formula (I) in the graft copolymer is incorporated in the polymer backbone.

4. The graft copolymer as claimed in claim 1, wherein the proportion of the monomer of formula (III) in the polymer backbone is from 70 to 99.5% by weight based on the total weight of the ethylenically unsaturated monomers of the backbone.

5. The graft copolymer as claimed in claim 1, wherein the polymer backbone comprises polymerized monomer of formula (II) and the monomer of formula (II) is methyl methacrylate or n-butyl methacrylate or a mixture thereof.

6. The graft copolymer as claimed in claim 1, wherein the monomer of formula (III) is one or more compounds selected from the group consisting of 2-ethylhexyl methacrylate, isononyl methacrylate, isodecyl methacrylate, dodecyl methacrylate, tridecyl methacrylate, pentadecyl methacrylate, hexadecyl methacrylate and octadecyl methacrylate.

7. The graft copolymer as claimed in claim 1, wherein the polymer backbone comprises polymerized comonomer d) and the comonomer d) is an α-olefin or styrene or a mixture thereof.

8. The graft copolymer as claimed in claim 1, wherein the copolymer grafted onto the backbone comprises polymerized monomer of formula (IV) and the monomer of formula (IV) is at least one selected from the group consisting of dimethylaminoethyl methacrylate, dimethylaminopropyl methacrylate, N-morpholinoethyl methacrylate, 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles, hydrogenated vinylthiazoles, vinyloxazoles, and hydrogenated vinyloxazoles.

9. A process for preparing graft copolymers as claimed in claim 1, comprising:
preparing the backbone by free-radical polymerization of monomers a), c) and optionally b) and/or d) and
grafting one or more monomers of formula (I) onto the backbone.

10. The process for preparing graft copolymers as claimed in claim 9, further comprising:
after the grafting of one or more monomers of formula (I), grafting one or more monomers of formula (IV).

11. The process for preparing graft copolymers as claimed in claim 9, further comprising:
prior to grafting one or more monomers of formula (I) grafting one or more monomers of formula (IV) onto the backbone.

12. The process for preparing graft copolymers as claimed in claim 9, wherein a mixture of one or more monomers of formula (I) and one or more monomers of formula (IV) is grafted onto the backbone.

13. The process for preparing graft copolymers as claimed in claim 9, wherein the grafting process is carried out up to 5 times in succession.

14. A lubricant oil additive concentrate, comprising from 15 to 85% by weight of one or more graft copolymers as claimed in claim 1.

15. The concentrate as claimed in claim 14, further comprising at least one of a mineral oil solvent and a synthetic oil solvent.

16. A lubricant oil composition comprising a graft copolymer as claimed in claim 1.

17. The lubricant oil composition as claimed in claim 16, wherein the graft copolymer is present in an amount in the range from 0.2 to 30% by weight.

18. The lubricant oil composition as claimed in claim 16, further comprising:
from 25 to 90% by weight of at least one of a mineral oil and a synthetic base oil, and
from 0.2 to 20% by weight in total of at least one additive selected from the group consisting of pour point depressants, VI improvers, aging stabilizers, detergents, dispersing assistants and wear-reducing components.

19. The lubricant oil composition as claimed in claim 16, further comprising:
0.05-10.0 percent by weight of an alkyl alkoxylate of formula (V)

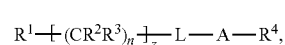 (V)

in which
$R^1$, $R^2$ and $R^3$ are each independently hydrogen or a hydrocarbon radical having up to 40 carbon atoms,
$R^4$ is hydrogen, a methyl or an ethyl radical,
L is a linking group,
n is an integer ranging from 4 to 40,
A is an alkoxy group having from 2 to 25 repeat units which are derived from ethylene oxide, propylene oxide and/or butylene oxide, where A includes homopolymers and random copolymers of at least two of the aforementioned compounds, and
z is 1 or 2, where the nonpolar moiety of the compound of formula (V) having the formula (VI)

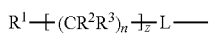
(VI)

contains at least 9 carbon atoms.

20. A lubricant oil composition, comprising:
a graft copolymer as claimed in claim 1 as a dispersing or nondispersing viscosity index improver, as a detersive or nondetersive component, as a pour point improver, as a wear-reducing component or as a component which reduces energy consumption by reducing wear.

21. A graft copolymer comprising
a polymer backbone; and
at least one graft copolymer grafted to the polymer backbone;
wherein
the backbone comprises free-radically polymerized units of
a) from 0.01 to 15% by weight of a compound of formula (I)

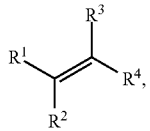
(I)

wherein
the compound of formula (I) is selected from the group consisting of 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol methacrylate, 1,10-decanediol (meth)acrylate, and 1,2-propanediol (meth)acrylate,
b) from 0 to 40% by weight of one or more (meth)acrylates of formula (II)

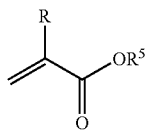
(II)

in which R is hydrogen or methyl and $R^5$ is a linear or branched alkyl radical having from 1 to 5 carbon atoms,
c) from 35 to 99.99% by weight of one or more ethylenically unsaturated ester compounds of formula (III)

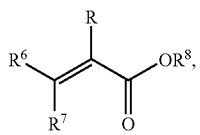
(III)

in which R is hydrogen or methyl, $R^8$ is a linear, cyclic or branched alkyl radical having from 6 to 40 carbon atoms, $R^6$ and $R^7$ are each independently hydrogen or a group of the formula —COOR$^{18}$ where $R^{18}$ is hydrogen or a linear, cyclic or branched alkyl radical having from 6 to 40 carbon atoms, and
d) from 0 to 40% by weight of one or more comonomers,
where the percentage by weight of the above components is based on the total weight of the ethylenically unsaturated monomers of the backbone and,
grafted onto the backbone of the copolymer, a graft copolymer, comprising:
a') from 0.01 to 25% by weight, based on the total weight of the copolymer, of a compound of formula (I)

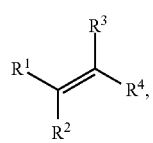
(I)

wherein the compound of formula (I) is selected from the group as described above, and
b') from 0 to 20% by weight, based on the total weight of the copolymer, of one or more compounds of formula (IV)

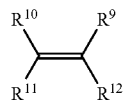
(IV)

in which $R^9$, $R^{10}$ and $R^{11}$ may each independently be hydrogen or an alkyl group having from 1 to 5 carbon atoms
and $R^{12}$ is either
a C(O)OR$^{13}$ group wherein $R^{13}$ is a linear or branched alkyl radical which is substituted by at least one —NR$^{14}$R$^{15}$ group and has from 2 to 20 carbon atoms, where $R^{14}$ and $R^{15}$ are each independently hydrogen, an alkyl radical having from 1 to 20 carbon atoms, and where $R^{14}$ and $R^{15}$, including the nitrogen atom and, if present, an additional nitrogen or oxygen atom, form a 5- or 6-membered ring which may optionally be substituted by $C_1$-$C_6$-alkyl, or
$R^{12}$ is an NR$^{16}$C(=O)R$^{17}$ group wherein $R^{16}$ and $R^{17}$ together form an alkylene group having from 2 to 6 carbon atoms, where they form a 4- to 8-membered saturated or unsaturated ring, optimally including an additional nitrogen or oxygen atom, where this ring may also optionally be substituted by $C_1$-$C_6$-alkyl; and
c') one or more ethylenic monomers not having structural units capable of forming H-bonds.

22. A graft copolymer, comprising:
a polymer backbone; and
at least one graft copolymer grafted to the polymer backbone;
wherein
the polymer backbone comprises free-radically polymerized units of
a) from 0.01 to 15% by weight of a compound of formula (I)

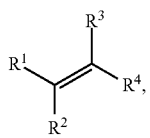
(I)

wherein the compound of formula (I) is selected from the group consisting of acrylic acid, methacrylic acid, 1-[2-(isopropenylcarbonyloxy)ethyl]maleate (monoester of 2-hydroxyethyl methacrylate (HEMA) and maleic acid), 1-[2-(vinylcarbonyloxy)ethyl]maleate (monoester of 2-hydroxyethyl acrylate (HEA) and maleic acid), 1-[2-(isopropenylcarbonyloxy)ethyl]succinate (monoester of HEMA and succinic acid), 1-[2-(vinylcarbonyloxy)ethyl]succinate (monoester of HEA and succinic acid), 1-[2-(isopropenylcarbonyloxy)-ethyl] phthalate (monoester of HEMA and phthalic acid), 1-[2-(vinylcarbonyloxy)ethyl]phthalate (monoester of HEA and phthalic acid), 1-[2-(isopropenylcarbonyloxy)-ethyl]hexahydrophthalate (monoester of HEMA and hexahydrophthalic acid), 1-[2-(vinylcarbonyloxy)ethyl]-hexahydrophthalate (monoester of HEA and hexahydro-phthalic acid), 1-[2-(isopropenylcarbonyloxy)butyl]-maleate (monoester of 2-hydroxybutyl methacrylate (HBMA) and maleic acid), 1-[2-(vinylcarbonyloxy)butyl]-maleate (monoester of 2-hydroxybutyl acrylate (HBA) and maleic acid), 1-[2-(isopropenylcarbonyloxy)butyl]-succinate (monoester of HBMA and succinic acid), 1-[2-(vinylcarbonyloxy)butyl]succinate (monoester of HBA and succinic acid), 1-[2-(isopropenylcarbonyloxy)butyl]-phthalate (monoester of HBMA and phthalic acid), 1-[2-(vinylcarbonyloxy)butyl]phthalate (monoester of HBA and phthalic acid), 1-[2-(isopropenylcarbonyloxy)butyl]-hexahydrophthalate (monoester of HBMA and hexahydrophthalic acid), 1-[2-(vinylcarbonyloxy)butyl]hexahydro-phthalate (monoester of HBA and hexahydrophthalic acid), fumaric acid, methylfumaric acid, monoesters of fumaric acid or their derivatives, maleic acid, methylmaleic acid, monoesters of maleic acid or their derivatives, crotonic acid, itaconic acid, acrylamidoglycolic acid, methacrylamidobenzoic acid, cinnamic acid, vinylacetic acid, trichloroacrylic acid, 10-hydroxy-2-decenoic acid, 4-methacryloyloxyethyl-trimethyl acid, and styrenecarboxylic acid, b) from 0 to 40% by weight of one or more (meth)acrylates of formula (II)

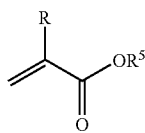
(II)

in which R is hydrogen or methyl and $R^5$ is a linear or branched alkyl radical having from 1 to 5 carbon atoms, c) from 35 to 99.99% by weight of one or more ethylenically unsaturated ester compounds of formula (III)

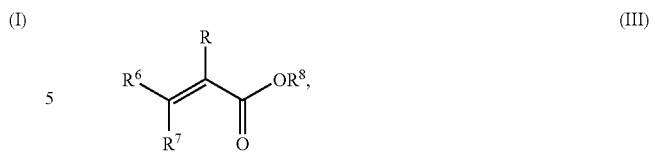
(III)

in which R is hydrogen or methyl, $R^8$ is a linear, cyclic or branched alkyl radical having from 6 to 40 carbon atoms, $R^6$ and $R^7$ are each independently hydrogen or a group of the formula —$COOR^{18}$ where $R^{18}$ is hydrogen or a linear, cyclic or branched alkyl radical having from 6 to 40 carbon atoms, and d) from 0 to 40% by weight of one or more comonomers, where the percentage by weight of the above components is based on the total weight of the ethylenically unsaturated monomers of the backbone and, grafted onto the backbone of the copolymer, a graft copolymer, comprising:

a') from 0.01 to 25% by weight, based on the total weight of the copolymer, of a compound of formula (I)

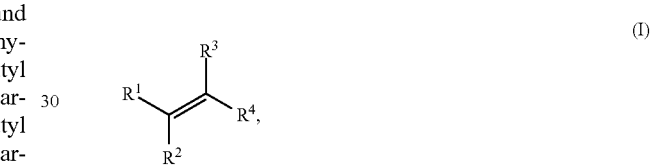
(I)

wherein the compound of formula (I) is selected from the group as described above, and b') from 0 to 20% by weight, based on the total weight of the copolymer, of one or more compounds of selected from the group consisting of dimethylaminoethyl methacrylate, dimethylaminopropyl methacrylate, N-morpholinoethyl methacrylate, 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles; and c') one or more ethylenic monomers not having structural units capable of forming H-bonds.

23. The graft copolymer as claimed in claim 1, wherein the compound of formula (I) is acrylic acid or methacrylic acid.

24. A graft copolymer, comprising:

a polymer backbone; and at least one graft copolymer grafted to the polymer backbone;

wherein the backbone comprises free-radically polymerized units of a) from 0.01 to 15% by weight of a compound of formula (I)

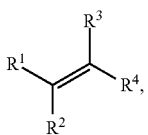

wherein
the compound of formula (I) is selected from the group consisting of 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol methacrylate, 1,10-decanediol (meth)acrylate, and 1,2-propanediol (meth)acrylate,
b) from 0 to 40% by weight of one or more (meth)acrylates of formula (II)

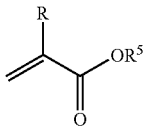

in which R is hydrogen or methyl and $R^5$ is a linear or branched alkyl radical having from 1 to 5 carbon atoms,
c) from 35 to 99.99% by weight of one or more ethylenically unsaturated ester compounds of formula (III)

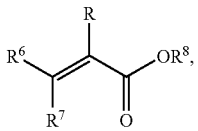

in which R is hydrogen or methyl, $R^8$ is a linear, cyclic or branched alkyl radical having from 6 to 40 carbon atoms, $R^6$ and $R^7$ are each independently hydrogen or a group of the formula —$COOR^{18}$ where $R^{18}$ is hydrogen or a linear, cyclic or branched alkyl radical having from 6 to 40 carbon atoms, and
d) from 0 to 40% by weight of one or more comonomers,
where the percentage by weight of the above components is based on the total weight of the ethylenically unsaturated monomers of the backbone and,
grafted onto the backbone of the copolymer, a graft copolymer, comprising:
a') from 0.01 to 25% by weight, based on the total weight of the copolymer, of a compound of formula (I)

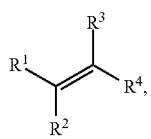

wherein the compound of formula (I) is selected from the group as described above, and
b') from 0 to 20% by weight, based on the total weight of the copolymer, of one or more compounds selected from the group consisting of dimethylaminoethyl methacrylate, dimethylaminopropyl methacrylate, N-morpholinoethyl methacrylate, 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles; and
c') one or more ethylenic monomers not having structural units capable of forming H-bonds.

* * * * *